United States Patent
Kolan et al.

(10) Patent No.: US 11,249,796 B2
(45) Date of Patent: Feb. 15, 2022

(54) METHOD AND APPARATUS FOR ENHANCED ASSERTION MANAGEMENT IN CLOUD MEDIA PROCESSING

(71) Applicant: Samsung Electronics Co., Ltd., Suwon-si (KR)

(72) Inventors: Prakash Kolan, Plano, TX (US); Imed Bouazizi, Frisco, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/590,284

(22) Filed: Oct. 1, 2019

(65) Prior Publication Data
US 2020/0110633 A1 Apr. 9, 2020

Related U.S. Application Data

(60) Provisional application No. 62/740,717, filed on Oct. 3, 2018, provisional application No. 62/822,136, filed on Mar. 22, 2019.

(51) Int. Cl.
*G06F 9/48* (2006.01)
*G06F 9/50* (2006.01)
*G06F 9/455* (2018.01)

(52) U.S. Cl.
CPC .............. *G06F 9/48* (2013.01); *G06F 9/455* (2013.01); *G06F 9/45533* (2013.01); *G06F 9/45558* (2013.01); *G06F 9/4806* (2013.01); *G06F 9/4843* (2013.01); *G06F 9/50* (2013.01); *G06F 9/5005* (2013.01); *G06F 9/5011* (2013.01); *G06F 9/5027* (2013.01); *G06F 9/5061* (2013.01)

(58) Field of Classification Search
CPC .. G06F 9/455; G06F 9/45533; G06F 9/45558; G06F 9/48; G06F 9/4806; G06F 9/4843; G06F 9/50; G06F 9/5005; G06F 9/5011; G06F 9/5027; G06F 9/5061
See application file for complete search history.

(56) References Cited

U.S. PATENT DOCUMENTS

| 9,171,015 B2 | 10/2015 | Byers | |
|---|---|---|---|
| 2012/0115433 A1* | 5/2012 | Young | H04L 41/5029 455/406 |
| 2013/0185433 A1* | 7/2013 | Zhu | H04L 43/0882 709/226 |

(Continued)

FOREIGN PATENT DOCUMENTS

KR 10-2015-0076786 A 7/2015

OTHER PUBLICATIONS

Dobson et al, "Towards unified QoS/SLA ontologies". Proceedings of the IEEE Services Computing Workshops (SCW'06), 2006, IEEE, pp. 1-6 (Year: 2006).*

(Continued)

*Primary Examiner* — Charles M Swift

(57) ABSTRACT

A method, an electronic device, and computer readable medium is provided. The method includes receiving, from a client device, an assertion that includes a value predicate; configuring entities in a workflow to accomplish a task within requirements of the value predicate found in the assertion; and directing a payload from a client device to the entities configured in at least one media processing entity.

20 Claims, 16 Drawing Sheets

(56) References Cited

U.S. PATENT DOCUMENTS

| | | | |
|---|---|---|---|
| 2014/0237550 A1 | 8/2014 | Anderson et al. | |
| 2014/0280952 A1 | 9/2014 | Shear et al. | |
| 2015/0135311 A1* | 5/2015 | MacKintosh | G06F 21/577 |
| | | | 726/22 |
| 2015/0332029 A1* | 11/2015 | Coxe | H04L 63/06 |
| | | | 726/9 |
| 2016/0110687 A1* | 4/2016 | Kamat | G06Q 30/016 |
| | | | 705/301 |
| 2016/0188468 A1 | 6/2016 | Rao | |
| 2017/0251076 A1* | 8/2017 | Bellur | H04L 41/5067 |
| 2017/0324813 A1* | 11/2017 | Jain | G06F 9/5016 |
| 2018/0324056 A1* | 11/2018 | Occhialini | G06F 3/04817 |
| 2019/0173802 A1* | 6/2019 | Xia | H04L 41/5003 |
| 2020/0097880 A1* | 3/2020 | Agarwal | G06F 9/451 |

OTHER PUBLICATIONS

ISA/KR, International Search Report and Written Opinion of the International Searching Authority, International Application No. PCT/KR2019/012949, dated Jan. 17, 2020, 8 pages.

Li, et al., "On efficient offloading control in cloud radio access network with mobile edge computing," 2017 IEEE 37th International Conference on Distributed Computing Systems, Jul. 17, 2017, 8 pages.

Extended European Search Report regarding Application No. 19869047.1, dated Sep. 24, 2021, 8 pages.

\* cited by examiner

METHOD AND APPARATUS FOR ENHANCED ASSERTION MANAGEMENT IN CLOUD MEDIA PROCESSING

CROSS-REFERENCE TO RELATED APPLICATION AND CLAIM OF PRIORITY

This application claims priority under 35 U.S.C. § 119(e) to U.S. Provisional Patent Application No. 62/740,717 filed on Oct. 3, 2019 and to U.S. Provisional Patent Application No. 62/822,136 filed on Mar. 22, 2019. The above-identified provisional patent application is hereby incorporated by reference in its entirety.

TECHNICAL FIELD

This disclosure relates generally to media processing. More specifically, this disclosure relates to an enhanced assertion management in cloud media processing.

BACKGROUND

Network processing is gaining traction where workloads that are not possible to be executed on mobile devices can be offloaded to the network (cloud). With this kind of architecture, the service providers can provide processing services (e.g., media processing services) in the network, and the mobile devices can request such processing by sending appropriate workflow setup requests. Based on the request, the network can setup process workflows to provide the requested processing. In this context, it becomes imperative that workflow requesters (mobile devices or service providers) are actually provided the processing which they have requested i.e. the workflow requesters need assurances that processing in the network is inline with their requests.

Cloud media processing is being increasingly preferred for performing compute intensive processing tasks. Enablers are being developed where a client device or a service provider requests setup of media processing in the cloud, the result of which is sent to one or more client devices. Many services are being developed that require real-time cloud media processing. As a result, client devices or the service providers that set up the media processing in the cloud have to rely on available media functions in the cloud and trust that the cloud provider is providing the media services which the client has actually requested. It is very much possible that due to real-time nature of media services, by the time the client or the service provider come to know of the actual media processing that was performed for their request, the service would have been delivered to intended recipients. Any wrong processing in the cloud would be identified at a very later stages when corrective actions cannot be taken any more. To solve this problem, client devices or the service provider that setup the media processing can also send a list of assertions to the cloud media service provider. The assertions will be evaluated in real-time during media processing to check the correctness of performed processing.

SUMMARY

This disclosure provides method and apparatus for enhanced assertion management in cloud media processing.

In one embodiment, an electronic device is provided. The electronic device includes a memory and a processor. The processor receives, from a client device, an assertion that includes a value predicate; configures entities in a workflow to accomplish a task within requirements of the value predicate found in the assertion; and directs a payload from a client device to the entities configured in at least one media processing entity.

In another embodiment, a method is provided. The method includes receiving, from a client device, an assertion that includes a value predicate; configuring entities in a workflow to accomplish a task within requirements of the value predicate found in the assertion; and directing a payload from a client device to the entities configured in at least one media processing entity.

In another embodiment, a non-transitory computer readable medium embodying a computer program is provided. The computer program includes computer readable program code that, when executed by a processor of an electronic device, causes the processor to receive, from a client device, an assertion that includes a value predicate; configure entities in a workflow to accomplish a task within requirements of the value predicate found in the assertion; and direct a payload from a client device to the entities configured in at least one media processing entity.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
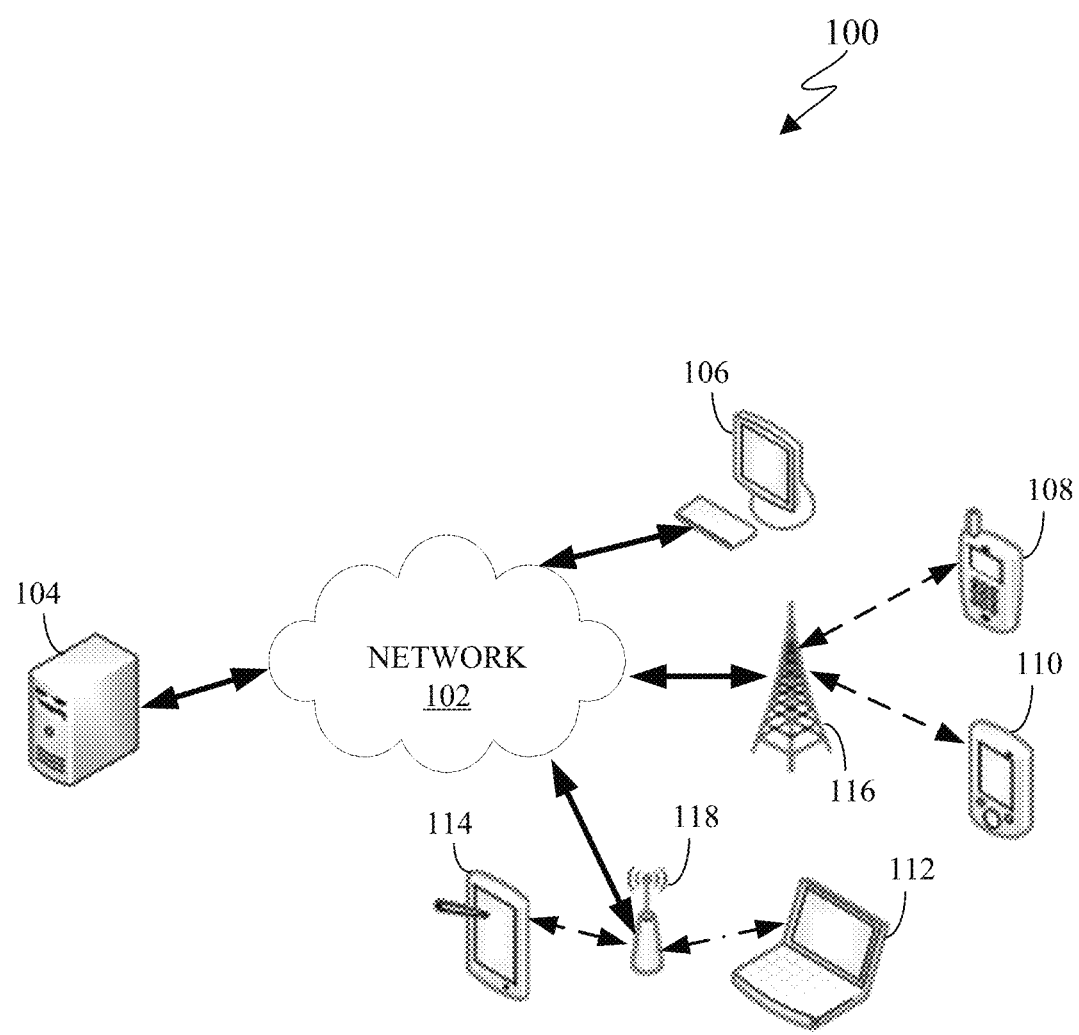
FIG. 1 illustrates an example communication system in accordance with an embodiment of this disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of this disclosure, can include a personal computer (such as a laptop or a desktop), a workstation, a server, a television, an appliance, a virtual assistant, and the like. Additionally, the electronic device can be at least one part of a piece of furniture or building/structure, an electronic board, an electronic signature receiving device, a projector, or a measurement device. In some embodiments, the electronic device can be a portable electronic device like a portable communication device (such as a smartphone or mobile phone), a laptop, a tablet, an electronic book reader (such as an e-reader), a personal digital assistant (PDA), a portable multimedia player (PMP), an MP3 player, a mobile medical device, a virtual reality headset, a portable game console, a camera, or a wearable device, among others. The electronic device can be one or a combination of the above-listed devices. Additionally, the electronic device as disclosed herein is not limited to the above-listed devices and can include new electronic devices depending on the development of technology. It should be noted that, as used here, the term "user" may denote a human or another device (such as an artificial intelligent electronic device) using the electronic device.

Due to increasing processing requirements for media applications and services, cloud processing is being preferred where workloads that otherwise would have been performed on the client device, are offloaded to a remote server. Due to computation capacity being higher at the remote server, it is feasible to run complex media processing tasks in the remote server or cloud and send either the final or near-to-final result to the client device. When computation is offloaded to a remote machine or network or cloud, the client device, or a service provider that is responsible for providing the respective media service, needs assurances from the cloud/network that the processing performed in the cloud is in-fact same as that of the requested processing. In addition, most of the media applications and services have real-time requirements, i.e. the compute processing in the network/cloud and distribution to intended recipients has to happen in real time. As a consequence, providing assurances to client and/or the service provider may not be feasible in real-time.

To address the problem of assuring the correctness of performed processing in the network/cloud, it is possible to use assertion checks. A set or list of assertion checks can be sent by the client or the service provider to the cloud media service provider, which the cloud media service provider checks in real-time during media processing and sends the check results back to the client or the service provider. If sufficient information is encoded in provided assertions that help prove the correctness of the performed processing, then the network/cloud processing can proceed forward and distribute the result of processing to intended recipients.

It is very often observed that the media processing required by the client or the service provider cannot be performed by one entity/function in the cloud/network. As a result, the cloud media service provider creates a workflow of functions/tasks and connects them together to provide the end-to-end processing that matches the requested processing that was received from the client or service provider. The entity in the cloud that performs the workflow creation is termed as the workflow manager. Further, the entity that requests setup of the workflow in the cloud such as a client device or service provider will be hereafter referred to as the workflow owner.

It is highly likely that in a distributed environment such as the cloud, different media processing functions or tasks that the workflow manager chains together to form an end-to-end service, the individual pieces i.e. individual functions/tasks are provided by different vendors. As a result, each of the function/task provides different levels of service guarantees, thus requiring a collective assertion checking mechanism. In addition, due to changing environment conditions (e.g. in the cloud due to fault tolerance, availability etc.) functions/tasks in the workflow may need to be changed from time to time. As a result, the assertion check mechanism should also be dynamic and adaptive. Further, the workflow manager should be able to translate workflow level assertions that it received from workflow owner to individual function/task level assertions so those assertions can be checked at the function/task level and aggregated for the whole workflow level.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head-mounted display (HMD), or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102. In some embodiments, the server 104 includes a workflow manager that can select functions and build a workflow pipeline to perform a media processing task. The workflow manager is discussed in greater detail below with respect to FIGS. 4A, 4B, and 5.

Each client device 106-114 represents any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications.

In this example, some client devices 108-114 communicate indirectly with the network 102. For example, the client devices 108 and 110 (mobile device 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In some embodiments, any of the client devices 106-114 transmits information securely and efficiently to another device, such as, for example, the server 104. Also, any of the client devices 106-114 can trigger the information transmission between itself and server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
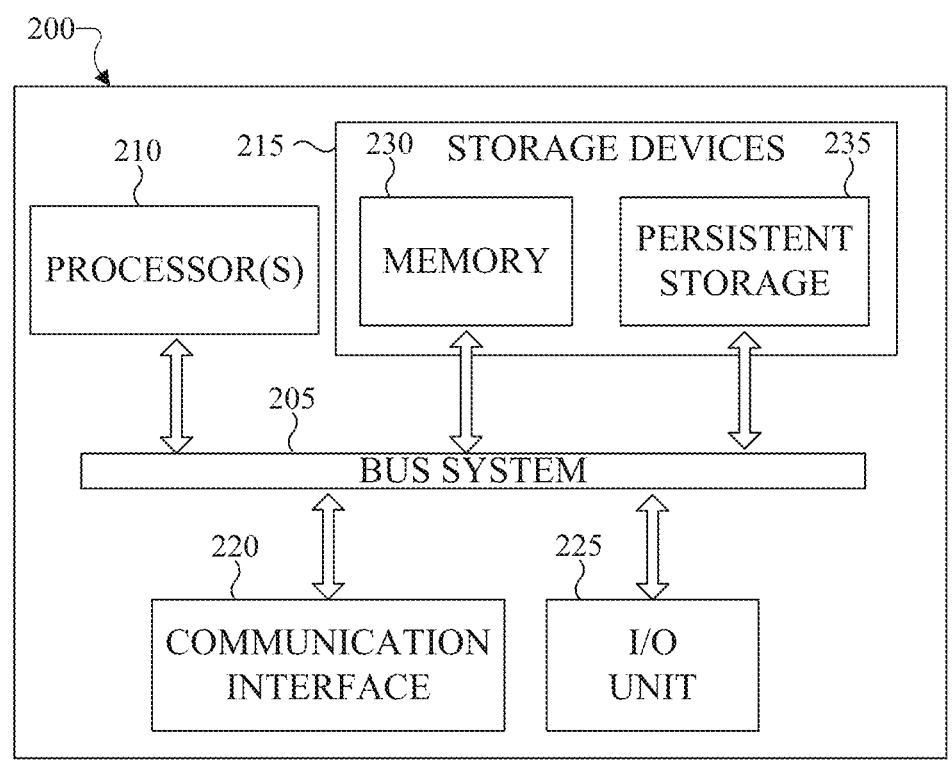
FIGS. 2 and 3 illustrate example electronic devices in accordance with an embodiment of this disclosure.
Figure 3:
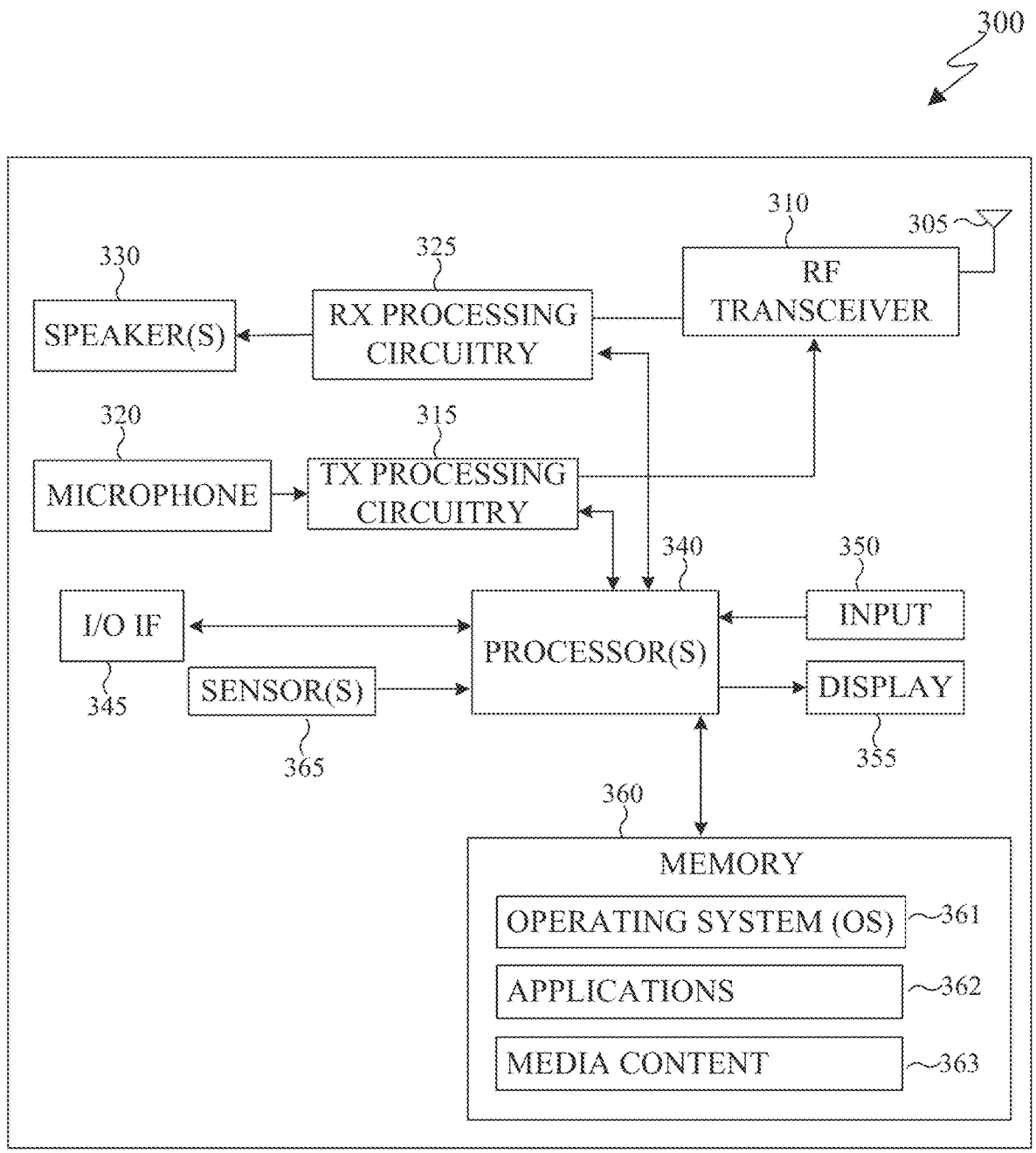

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more local servers, one or more remote servers, clustered computers, and components that act as a single pool of seamless resources, a cloud-based server, and the like. The server 200 can be accessed by one or more of the client devices 106-114 of FIG. 1.

As shown in FIG. 2, the server 200 includes a bus system 205 that supports communication between at least one processing device 210, at least one storage device 215, at least one communications interface 220, and at least one input/output (I/O) unit 225. The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an example electronic device 300, and the electronic device 300 could represent one or more of the client devices 106-114 in FIG. 1. For example, in some embodiments, the electronic device 300 may implement or represent a virtual assistant device that can receive a natural language input, derive meaning from the input, and perform an action based on the derived meaning. The electronic device 300 can be a mobile communication device, such as, for example, a mobile station, a subscriber station, a wireless terminal, a desktop computer (similar to desktop computer 106 of FIG. 1), a portable electronic device (similar to the mobile device 108, PDA 110, laptop computer 112, or tablet computer 114 of FIG. 1), and the like.

As shown in FIG. 3, the electronic device 300 includes an antenna 305, a communication unit 310, transmit (TX) processing circuitry 315, a microphone 320, and receive (RX) processing circuitry 325. The communication unit 310 can include, for example, a radio frequency (RF) transceiver, a BLUETOOTH transceiver, a WI-FI transceiver, a ZIGBEE transceiver, an infrared transceiver, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361, one or more applications 362, and media content.

The communication unit 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The communication unit 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in a memory 360, such as the OS 361 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive, store, and timely instruct by providing ASR processing and the like. The processor 340 can move data into or out of the memory 360 as required by an executing process. In some embodiments, the processor 340 is configured to execute a plurality of applications 362 based on the OS 361 or in response to signals received from external source(s) or an operator. Example, applications 362 can include a camera application (for still images and videos), a video phone call application, an email client, a social media client, an SMS messaging client, a virtual assistant, and the like. In some embodiments, the processor 340 is configured to receive and transmit the media content 363. The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with sensor(s) 365 and/or a camera by providing additional input to processor 340. In some embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content 363. The media content 363 can include various types of media such as images, videos, three-dimensional content, VR content, AR content, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an air pressure sensor, a magnetic sensor or magnetometer, a grip sensor, a proximity sensor, a color sensor, a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor 365 can further include control circuits for controlling any of the sensors included therein. Any of these sensor(s) 365 can be located within the electronic device 300.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4A:
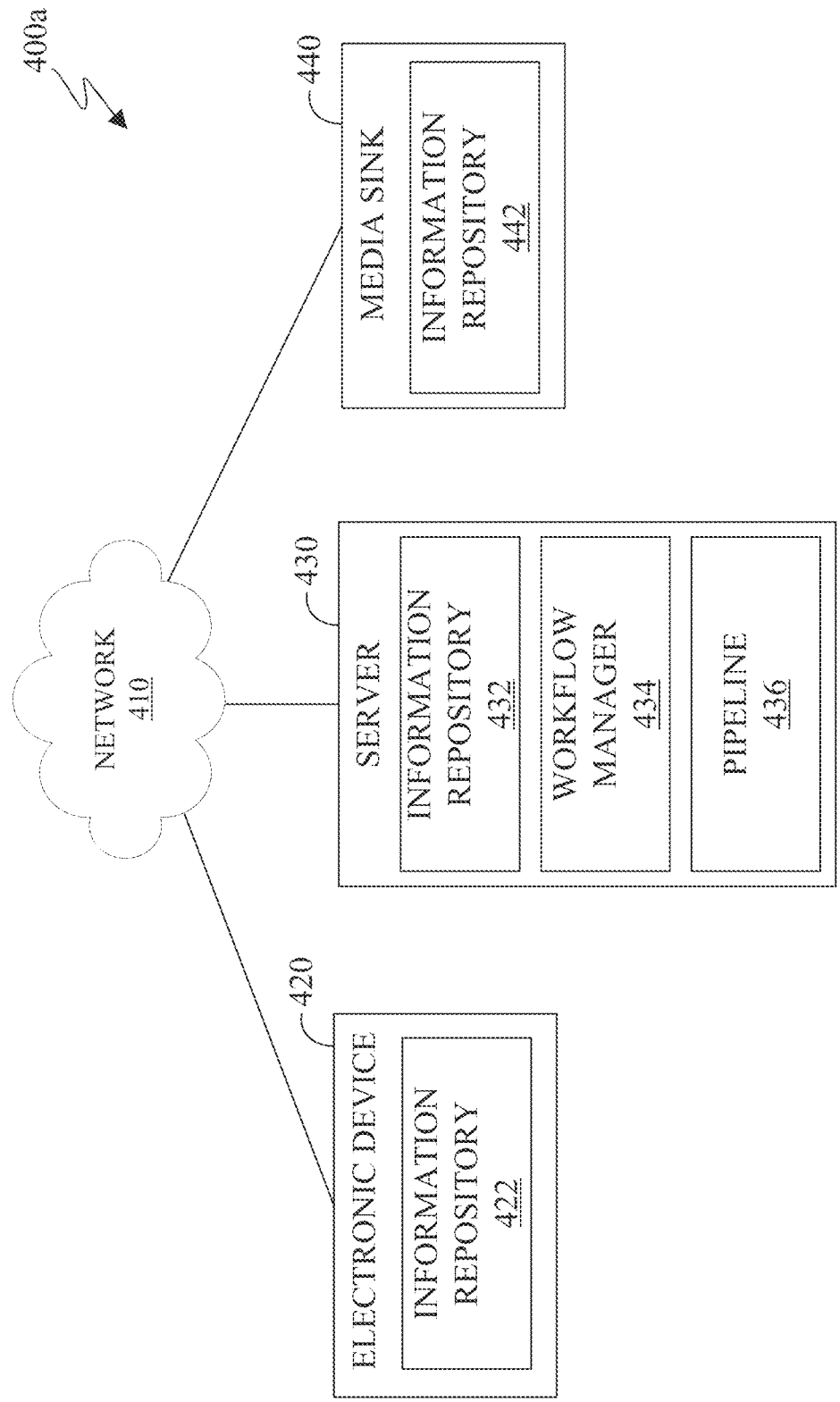
FIG. 4A illustrates a block diagram of an example environment-architecture in accordance with an embodiment of this disclosure.
Figure 4B:
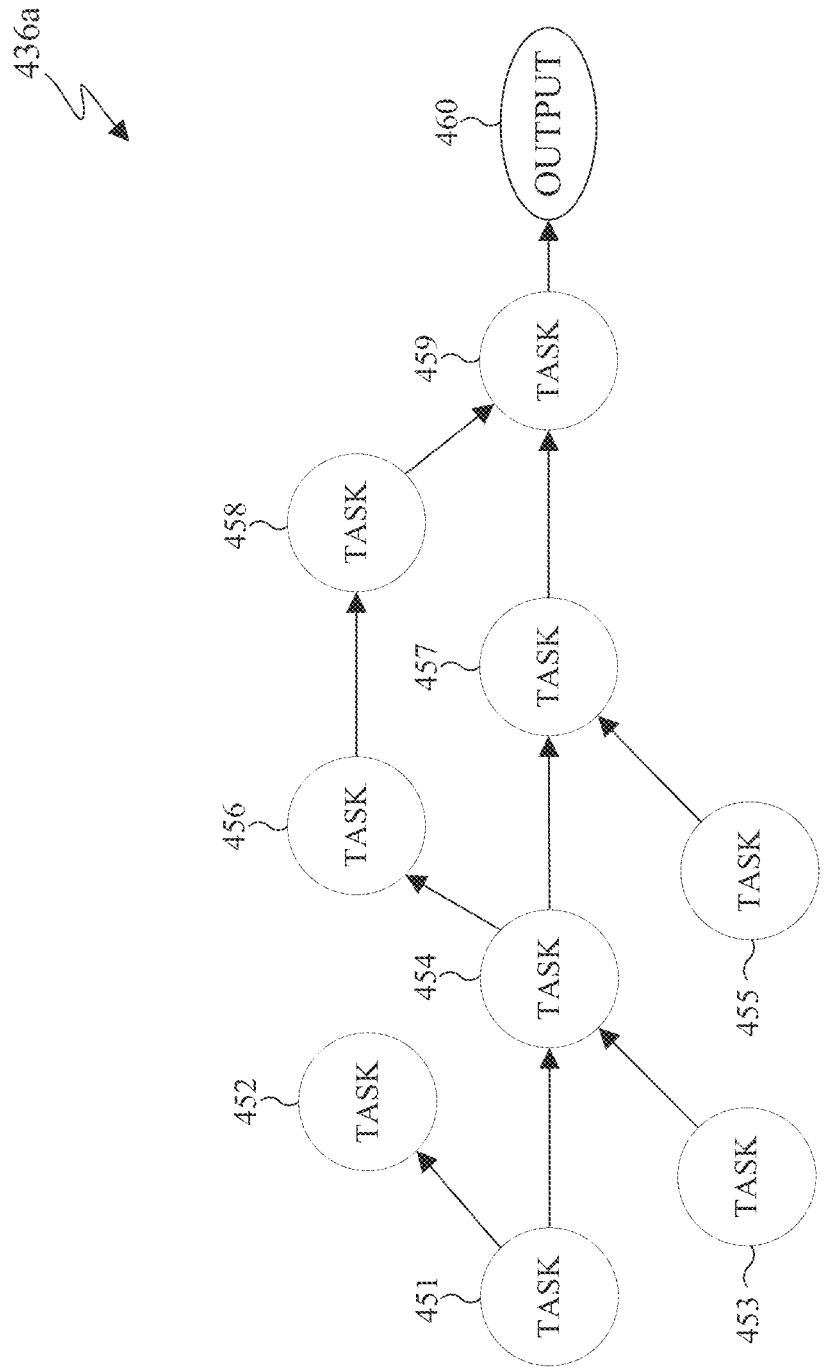
FIG. 4B illustrates and example pipeline in accordance with an embodiment of this disclosure.
Figure 4C:
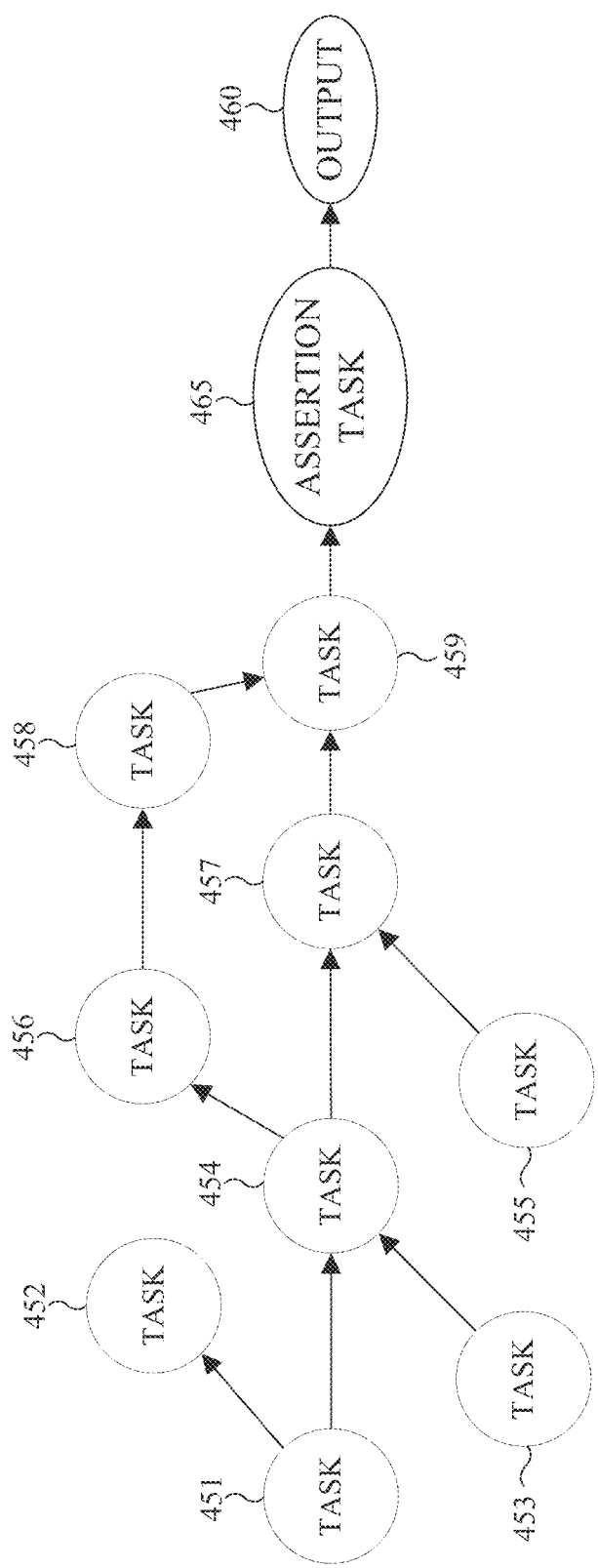
FIG. 4C illustrates an example pipeline with an assertion task in accordance with an embodiment of this disclosure.
Figure 4D:
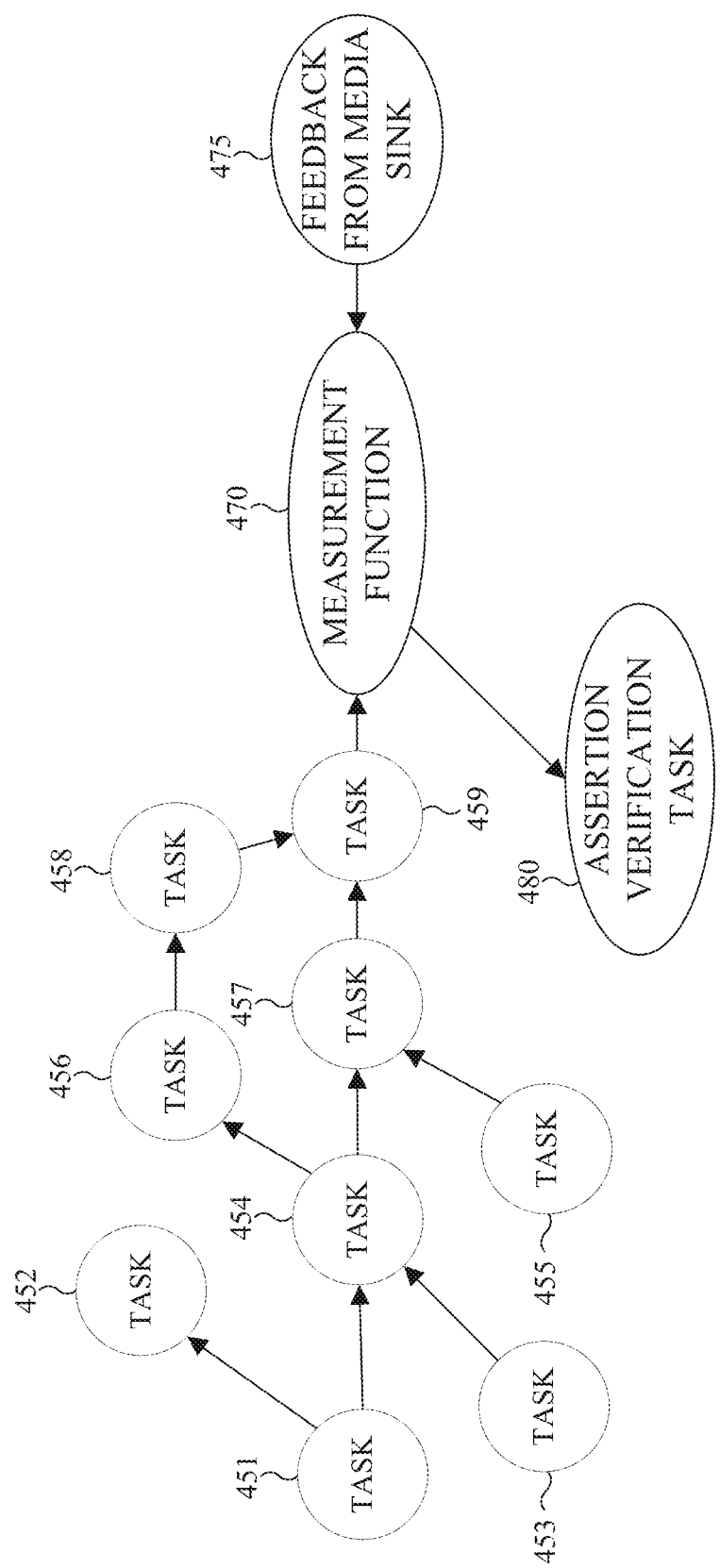
FIG. 4D illustrates an example pipeline for confirmation of processes in a workflow in accordance with an embodiment of this disclosure.

FIG. 4A illustrates a block diagram 400 of an example environment-architecture in accordance with an embodiment of this disclosure. FIG. 4B illustrates and example pipeline 436 a in accordance with an embodiment of this disclosure. FIG. 4C illustrates an example pipeline with an assertion task 465 in accordance with an embodiment of this disclosure. FIG. 4D illustrates an example pipeline for confirmation of processes in a workflow in accordance with an embodiment of this disclosure. The embodiments of FIGS. 4A, 4B, and 4C are for illustration only. Other embodiments can be used without departing from the scope of this disclosure.

As shown in FIG. 4A, the block diagram 400 includes an electronic device 420, a server 430 and a media sink 440 in communication over a network 410. The network 410 can be the same as or similar to the network 102 of FIG. 1. In some embodiments, the network 410 represents a "cloud" of computers interconnected by one or more networks, where the network is a computing system utilizing clustered computers and components that act as a single pool of seamless resources when accessed. Also, in some embodiments, the network 410 is connected with one or more servers (such as the server 104 of FIG. 1, the server 200, and the server 430), one or more electronic devices (such as the client devices 106-114 of FIG. 1, the electronic device 300, and the electronic device 420). Further, in some embodiments, the network 410 can be connected to an information repository (such as the media sink 440, and database), that contains a look-up tables and information pertaining to various functions as well as a repository of published media.

In some embodiments, the electronic device 420 and the media sink 440 can represent one of the client devices 106-114 of FIG. 1, the electronic device 300 of FIG. 3, or other suitable device. In other embodiments, a portion of the components included in the electronic device 420 and the media sink 440 can be included in different devices, such as the server 430, multiple servers 104 or 200, multiple client devices 106-114, or other combination of different devices. In some embodiments, the electronic device 420 and the media sink 440 are the same device.

In this example, the electronic device 420 includes an information repository 422. Similarly the media sink 440 can includes an information repository 442. The electronic device 420 can include a camera or additional components that can capture or receive media. In some embodiments, the captured or recorded media requires a certain type of processing such as VR stitching, but lacks the processing capabilities to perform the necessary processing of the media content. The media sink 440 represents a storage device that the processed media can be delivered after processing by the server 430.

The information repository 422 and 442 represent any suitable structure(s) capable of storing and facilitating retrieval of information (such as data, program code, or other suitable information on a temporary or permanent basis). The information repository 422 and 442 can include a memory and a persistent storage. The memory can be RAM or any other suitable volatile or non-volatile storage device(s), while the persistent storage can contain one or more components or devices supporting longer-term storage of data, such as a ROM, hard drive, Flash memory, or optical disc. The information repositories 422 and 442 can include one or more media content such as the media content 363 of FIG. 3.

The electronic device 420 can include a user interface that enables a user to select media content to be offloaded from the information repository 422 to the server 430 for processing. The user interface can also enable the user to provide instructions to the server 430 as to what type of media processing is to be performed with respect to the media content. The electronic device 420 can offload media content for processing on the server 430. The server 430 can perform a network based media processing workflow by creating as a pipeline 436 of media processing functions (or tasks) for a received media processing request. For example, a media source, such as the electronic device 420, sends a workflow description to the server 430. The workflow description provides a description of the input. For example, if the input is based on recordings from multiple cameras, the input description can include the number of cameras that recorded the content, the relative position of the cameras with respect to each other, the format the content was captured, and the like. The workflow description can also include a request for the intended media processing, such as VR stitching. Additionally, the workflow description can include a location (such as the media sink 440) the media content is to be moved to after the processing, such as an expected distribution output post processing.

After the server 430 receives the workflow description from the electronic device 420, the server 430 identifies one or more functions, entities, tasks, services, and the like to perform the media processing based on the workflow description and information associated with each of the functions.

In some embodiments, the server 430 can be implemented as shown in FIG. 2. In other embodiments, a portion of the components included in the server 430 can be included in different devices, such as multiple servers 104 or 200, multiple client devices 106-114, multiple electronic devices 300, or a combination of different devices. The server 430 can represent one or more local servers, one or more remote servers, a network based media processing (NBMP) framework, or the like. The server 430 can be a web server, a server computer such as a management server, or any other electronic computing system capable of sending and receiving data. The server 430 can include an information repository 432, a workflow manager 434, and a pipeline 436.

The information repository 432 can be the same as or similar to the information repositories 422 and 442. The information repository 432 represents any suitable structure(s) capable of storing and facilitating retrieval of information (such as data, program code, or other suitable information on a temporary or permanent basis). The information repository 432 can include a memory and a persistent storage. The memory can be RAM or any other suitable volatile or non-volatile storage device(s), while the persistent storage can contain one or more components or devices supporting longer-term storage of data, such as a ROM, hard drive, Flash memory, or optical disc.

The workflow owner can provide definitions of assertions included in the workflow description document to the workflow manager 434. Examples of definitions can be found in the following table.

| Name | Description |
| --- | --- |
| Minimum Priority | Minimum priority above which all assertions with higher priority must be processed |
| Minimum Priority Action | Common action for all lower priority assertions. i.e. assertion whose priority is less than the Minimum Priority |
| Support Verification | Indicates whether the resource supports providing verification information for validating function assertions |
| Verification Acknowledgement | Acknowledgement for verification |
| Certificate | Public certificate for signature verification |
| Assertion | Dictionary of name value predicate pairs (NVPs). Each NVP pair consists of Name and Value Predicate fields |

The workflow owner can provide a list of assertions in the media processing request that it sends to the workflow manager 434. Each assertion in the assertion list can be a name value pair (NVP) where: "Name" can be a string that represents the parameter that the workflow owner wants the workflow manager to assert check and "Value" can be an object representing the assertion predicate to evaluate the parameter. The value object represents all the following information.

| Field inside Value Predicate | Description |
| --- | --- |
| Evaluation Condition Function | The condition against which the parameter will be checked with the given value |
| Aggregation Function | Aggregation rule/function to be used to while translating workflow level assertions to individual function/task level assertions or vice versa |
| Priority Function | priority of an assertion |
| Check Value | The value to be used while evaluating the condition |
| Offset Function | Offset limit that the parameter can deviate from given value for the evaluation condition to evaluate to a success |
| Action Function | Action to perform if the evaluation has failed |
| Action Parameters Function | Parameters while an action represented using an Action function is performed |

The table below shows example aggregation functions for some example parameters.

| Parameter | Aggregate Function | Description |
| --- | --- | --- |
| qos.delay | Sum | Check value given in Value Predicate is to be asserted over the sum of delays of individual NBMP tasks |
| qos.bandwidth | Min | Check value given in Value Predicate is to be asserted over the min of bandwidth of individual NBMP tasks |
| qos.throughput | Max | Check value given in Value Predicate is to be asserted over the max of throughput of individual NBMP tasks |
| processing.hardware.CPUCores | Min | Check value given in Value Predicate is to be asserted over the min of processing.hardware.CPUCores of individual NBMP tasks |
| output.mediadescription.MediaType | is same as | Check value given in Value Predicate is to be asserted over the equality of media type of output stream |

As shown in above table, the Aggregate Function defines the procedure for aggregating individual task level parameters against which the parameters mentioned in the workflow setup request are to be asserted against. The workflow owner specifies the aggregation function inside the workflow creation request that it sends to the workflow manager 434. The workflow manager 434 can use these aggregation functions to translate the workflow level assertion to individual task level assertions when it builds workflow of tasks.

When assertions are provided in the workflow creation request, the workflow owner can also specify the action to be performed when the assertion fails. Examples of possible values of actions that can be included in the action field of value predicate described can be shown in the following table.

| Value of Action field in Value Predicate | Description |
| --- | --- |
| Rebuild | Rebuild the workflow |
| Reorganize | Re-organize/re-arrange the workflow to satisfy the assertion |
| Restart | Restart the workflow with same tasks to satisfy the assertion |
| Terminate | Terminate the workflow |
| Wait | Wait for certain time to continue execution of workflow |
| Continue | Continue execution of workflow irrespective of failed assertion |

As shown in the above table, the workflow owner can specify the action to be performed when the assertion check that is checked at the workflow level fails. The assertion check at the workflow level is checked using the aggregation function on individual task level parameters. The Action function can include certain action parameters, such as shown in the following table.

| Action | Action Parameter | Type | Units | Description |
| --- | --- | --- | --- | --- |
| Wait | Wait time | Number | Milli-seconds | Time to Wait |

If the NBMP source does not specify the aggregation function for any parameters that it sent to the workflow manager 434, it is left to the workflow manager 434 to choose its own aggregation function when no such information is found in the workflow description document or the function definition. Examples of aggregation function are shown in the following table.

| Name | Format of Aggregation field in WDD | Description |
| --- | --- | --- |
| Sum | sum | Aggregate based on sum over parameters of individual tasks |
| Min | min | Aggregate based on minimum |
| Max | max | Aggregate based on maximum |
| Average | avg | Aggregate based on average |

It is often observed that workflow owner requests setup of media processing that requires set of a multiple of processing tasks. With multiple processing tasks in the workflow, it is often lost whether the media processing correctly applied certain kind of processing that the workflow owner requested for. For example, a number of media processing in the cloud use cases include adaptation of cloud media processing based on end client device capabilities or end user preferences. A workflow with certain media processing followed by, for example, adaptive media distribution (e.g., using HTTP DASH), or viewport dependent streaming can require certain input from the end user client based on which the processing in the cloud will be affected. MPEG is defining a media processing function called "measurement function" 470 that can be inserted in the workflow chain so this function can take input from the end client device and inform other processing tasks in the workflow to update their processing based on such information received from the end client device.

With such adaptive processing possible, it is sometimes required that the workflow owner is aware of insertion of such measurement function 470. As described before, it would be too late for the workflow owner to know that a measurement function 470 was not included in spite of the request from workflow owner to workflow manager 434 to use end client capabilities or preferences. For this type of process oriented guarantees, the assertion check mechanism described before can be used.

For process related assertion checks, the workflow owner specifies a list of process assertions in the workflow creation request Similar to the case of parameters, the NVP described above can be used to specify process assertions. The meaning of individual parameter of the NVP will be as follows: "Name" can be a string that represents the process that needs to be checked. The name should always start with "process." (e.g., process.viewportcollection) and "Value" can be an object representing the assertion predicate to evaluate the process defined by the process given in Name string. The value object represents all the following information.

| Field inside Value Predicate | Description |
| --- | --- |
| Action | Action to perform if the process evaluation has failed |

As described above the assertion structure for process related assertion checks is similar to assertion check for parameters with the difference that the assertion structure for process assertions only has the Action field in the value predicate. The significance of the action parameter and possible values of this action parameter are identical to that of the action field in assertion structure of parameters. Below is a table that includes an example candidate list of processes.

| Process to be verified | Description |
| --- | --- |
| Process.viewportcollection | Verify whether view port is being collected |
| Process.userpreferences | Verify whether user preference information is collected |
| Process.devicecapability | Verify whether device capability information is collected |
| Process.failover | Verify whether the indicated failover method in the workflow creation requested is being followed |
| Process.monitoring | Verify whether the indicated monitoring is being performed |

When the workflow manager 434 receives a workflow creation request with process assertion described above, the workflow manager 434 can be responsible for forwarding the proof of the application of the said process back to the workflow owner.

One way for the proof to be returned to the workflow owner regarding the application of a process e.g., whether the user feedback based on viewport is being collected in the workflow is to do the following:

1. The measurement function that is inserted in the workflow supports process application confirmation. For example, the measurement function can issue a message with confirmation code that is digitally signed.

2. The workflow manager 434 can forward the digitally signed confirmation code along with the public certificate to the workflow owner 420. Optionally, since the workflow owner has access to the function repository in the network, the workflow owner can download the public certificate of such measurement function 470.

3. Once the workflow owner has the public certificate and the digitally signed message with confirmation code which it receives from the workflow manager 434, the workflow owner can digitally verify whether or not such measurement function that is collecting user feedback is inserted in the workflow.

To support providing proof for process related assertions as described before, the function definition that is included in the function repository is to be enhanced. For example, the measurement function definition that is digitally signing the confirmation code can provide such details in its function definition. The functions, in addition to their existing information, include process verification capability information such as the following table.

| Field in Function Definition | Type | Description |
| --- | --- | --- |
| Support process verification | Boolean | Indicates whether the function supports providing verification information for validating process assertions |
| Supported processes | List | List of processes for which the verification is available |
| Confirmation Code | String | Confirmation code that is provided for verification |
| Certificate | Security Certificate | Public certificate so anyone can verify messages that are digitally signed by the function |

FIGS. 4B-4D illustrate a workflow pipeline with multiple tasks, tasks 451-459. Each task represents a function, similar to the function 470, of FIG. 4C. The workflow manager 434 selects each of the tasks 451-459 in order to generate the output 460 based on a received workflow description from the electronic device 420. Task 451, 453, and 455 can receive the input data, or a portion of the input data. In some embodiments, a function can receive multiple inputs such as the tasks 454 and 457. In some embodiments, a function can generate multiple outputs, such as the task 451 and 454. In some embodiments, functions can process data in parallel such as the tasks 454, 457, 459, 456, and 458.

As shown in FIG. 4A, the workflow description, which provides information for media processing, is sent from the NBMP source 420 to the workflow manager 434, which the workflow manager 434 uses to select a set of MPEs and run media processing tasks in them. The tasks to be run in the MPE are chosen from a function repository 430. The workflow manager 434 then runs the selected tasks in one or more media processing entities; configures the tasks; and connects control and data plane paths between the NBMP source 420, the provisioned MPEs, and the media sink 440. The workflow can be shown as a directed acyclic graph (DAG) as shown in FIGS. 4B-4D.

When the media source 420 sends a workflow description document to the workflow manager 434, the workflow manager 434 sets up required workflow with one or more MPEs. However, there is no assurance that the MPEs set up by the workflow manager 434 can perform media processing as requested by the media source 420. To provide assurance to the media source 420, the NBMP framework can provide assertion checks that can be executed at different stages of the workflow.

To support assertions for network based media processing, this contribution describes assertion checks at two levels—at the task level and the workflow level. To support assertion at the workflow level, the present disclosure provides that the workflow manager 434 can insert an "assertion task" 465 at the end of the workflow as shown in FIG. 4C.

The assertion task 465 is a common task that every function repository can include in its list of supported tasks. When the assertion task 465 is included in the function repository, the assertion task 465 can be read by the workflow manager 434 and/or the media source 420. If the media source 420 intends to receive an assertion that the media processing is being performed as expected, the media source 420 can include assertion description in the workflow description document sent to the workflow manager 434. When the workflow manager 434 receives a workflow description document with assertion description, the workflow manager 434 would then create an assertion task 465, configure the assertion task 465 based on information in the workflow description document, and then insert this task as the last node of the DAG that is built to provide the workflow.

The assertions are included by the media source as a list of Name Value Pairs (NVPs) where: "Name" is a string that represents the parameter and "Value" is an object representing the assertion predicate to evaluate the parameter. The value object represents all the following information.

| Field inside Value Predicate | Description |
| --- | --- |
| Evaluation Condition | The condition against which the parameter will be checked with the given value |
| Check Value | The value to be used while evaluating the condition |
| Offset | Offset limit that the parameter can deviate from given value for the evaluation condition to evaluate to a success |
| Action | Action to perform if the evaluation has failed |

For example, the media source can include the following two assertions in the workflow description document.

| Parameter | Value Predicate | | | |
| --- | --- | --- | --- | --- |
| Delay | Evaluation Condition <(less than) | Check Value 10 msec | Offset 2 msec | Action Report |
| Bandwidth | Evaluation Condition >(greater than) | Check Value 50 mbps | Offset 5 mbps | Action Stop |
| Output Video Format | Evaluation Condition Same as | Check Value H264 | Offset None | Action Stop |

When the workflow manager 434 receives the workflow description document with above assertions, the workflow manager 434 can configure the assertion task to check if the delay caused for the workflow exceeded a maximum delay of 12 msec (10 msec+2 msec=12 msec). In case the delay exceeds 12 msec based on the configured action parameter, the assertion task 465 can report the failed assertion to media source but will continue to stream the output to the media sink 440. In case of bandwidth parameter, if the assertion fails, the assertion task 465 can stop streaming the output to the media sink 440 as configured in the assertion action. The following is a list of assertions and their parameters which can be included in the assertion list of NVPs sent in the workflow description document from the media source.

| Type of Assertions | Description | List of Parameters |
|---|---|---|
| Quality assertions | Provides description to create assertions that check the quality of media processing | All network, transport, and application level parameters such as delay, bandwidth, throughput, QoS etc. |
| Computational assertions | Provides description to create assertions that check the computational requirements of media processing | All hardware parameters (e.g., processor, CPU cores, GPUs, GPU acceleration), storage parameters (local storage, aggregated storage) etc. |
| Input assertions | Provides description to create assertions that check whether the workflow input is of certain kind | Media parameters such as Input media format, bandwidth, codec type, media type, clock rate, protocol. Metadata parameters such as metadata type, protocol etc. List of parameters also include the media parameters from MPEG-V and MPEG MORE standards |
| Output assertions | Provides description to create assertions that check whether the workflow output is of certain kind | Media parameters such as Input media format, bandwidth, codec type, media type, clock rate, protocol. Metadata parameters such as metadata type, protocol etc. List of parameters also include the media parameters from MPEG-V and MPEG MORE standards |

To support uniform representation and configuration of parameters, evaluation conditions, and action values that can be included for each assertion, the assertion task 465 in the function repository can include supported evaluation conditions and action values. When the media source 420 reads the assertion task 465 from the function repository, the media source 420 can retrieve the supported values for above parameters (evaluation condition, action etc.) and then appropriately build the assertion description that it includes in the workflow description document.

For asserting at the task level, the following has to take place:

1. Similar to workflow level, the media source 420 includes assertions with list of NVPs in the workflow description document.

2. When the workflow manager 430 builds the list of tasks to include in the workflow, for each assertion in the assertion list, the workflow manager 434 builds appropriate assertions for each task that will be included in the workflow. For example, the workflow manager 434 can translate the workflow level assertions to task level assertions as appropriate for each task. The task level assertions are included in the assertion descriptor of the task definition.

3. The format of assertions at the task level is similar to that of workflow level. For example, a list of assertion NVPs as described in previous section.

Once the tasks that will be included in the workflow are augmented with assertion information, the MPEs that execute those tasks are required to evaluate all the assertion conditions and perform the action as indicated.

Every NBMP service provider can include a list of functions in a function repository. In such repository, the service provider can also include an assertion function that can be run as a task when deployed in a MPE. The service provider can provide details of the assertion task which the media source 420 and the workflow manager 434 can read to configure the assertion for network media processing.

Examples of details that can be included for the assertion function in the function repository are included in the following table.

| Detail | Description |
|---|---|
| Assertion Function Name & Type | Name and type of assertion Function |
| Level | What level the assertion function can be executed at (e.g., workflow, task, source i.e. as first task in the workflow) |
| Input ports | Number of supported input ports which defines the number of tasks from which this task can take an input from |
| Supported evaluation methods/ conditions | Fist of evaluation conditions that can executed against any parameter (e.g., =, >, <, same as, consists of etc.) |
| Value Types | List of value types that any parameter can be checked against with any of the supported evaluation condition |
| Actions | List of supported actions (e.g., do not block - do not block any input, forward - forward the output as received, block - stop the output from going out, split - create a split stream of received input, reverse - send it back to source) etc. |

In addition to assertions for tasks and workflows, NBMP sinks can be asked to perform assertions for content they received as a result of media processing in the network. The NBMP source can indicate the requirement for signaling assertion validation at the NBMP sink in the workflow description document it sends to the workflow manager. With this requirement, the NBMP source can indicate the number of NBMP sinks or a percentage of NBMP sinks that are receiving the content to run assertions. The NBMP source can also indicate that the result of assertions is send back as a report to the NBMP source or the workflow manager. The endpoints to receive such reports are signaled to the NBMP sinks that will be running the assertions.

The workflow manager can require that a number of NBMP sinks or percentage of NBMP sinks receiving the content run assertions even if the NBMP source has not asked for it. Similar to the NBMP source requested case, all the sinks that are requested to perform assertions should send back the validation reports to the workflow manager 434.

Below are tables that focus on an extensive list of parameters that can be used for generation assertions. For example, the media data parameters can include video parameters, audio parameters and other media parameters. The video parameters can include codec identification; profile, level, tier to which the bitstream conforms; color primaries; maximum width, height, and frame rate of the video. The audio parameters can include codec identification; profile and level; and number of channels. The other media parameters that can be included are shown in the following table.

| No | Parameter |
|---|---|
| 1 | Gyroscope readings |
| 2 | Accelerometer readings |

Metadata Parameters can include media metadata parameters, camera metadata parameters, microphone metadata parameters, sensor metadata parameters, and system metadata parameters. The media metadata parameters can include parameters from the following table.

| No | Parameter |
| --- | --- |
| 1 | Title |
| 2 | Artist |
| 3 | Genre |
| 4 | Now Playing |
| 5 | Publisher |
| 6 | Copyright |
| 7 | Encoded by |
| 8 | Comments |
| 9 | Date |
| 10 | Track Number |
| 11 | Language |
| 12 | Major band |
| 13 | Minor Version |
| 14 | Compatible Brands |
| 15 | Creation Time |
| 16 | Timecode |
| 17 | Handler Name |
| 18 | URL |
| 19 | Duration |
| 20 | Start Bitrate |
| 21 | Text Format |
| 22 | Text Codec Id |
| 23 | Language of Subtitle |
| 24 | Number of Chapters |
| 25 | Album |
| 26 | Location |
| 27 | Set number |
| 28 | Set count |
| 29 | Recording Date |

The camera metadata parameters can include parameters from the following table.

| No | Parameter |
| --- | --- |
| 1 | Camera video capture format |
| 2 | Camera resolution |
| 3 | Camera frames rate |
| 4 | Camera image capture format |
| 5 | Lens mode |
| 6 | Lens Distortion |
| 7 | Focal Length |
| 8 | Image Sensor Format |
| 9 | Principal point offset |
| 10 | Axis skew |
| 11 | Skew coefficient |
| 12 | Rotation |
| 13 | Translation |
| 14 | Digital sensor width |
| 15 | Image width in pixels |
| 16 | Desired resolution of output image |
| 17 | Desired resolution of output video |
| 18 | Desired level of blending |
| 19 | Pixel Dimensions |
| 20 | CroppingInformation |
| 21 | Picture aspect ratio |
| 22 | Chroma format |
| 23 | Color sampling format |
| 24 | Sample aspect ratio |
| 25 | Bit depth |
| 26 | Encoding Format |
| 27 | Spherical |
| 28 | Projection Type |
| 29 | Stereo Mode |
| 30 | Coverage |
| 31 | Number of Regions |
| 32 | Codec Id |
| 33 | Bit Rate |
| 34 | Scan Type |
| 35 | Scan Order |
| 36 | Bits per Pixel Frame |
| 37 | Color Range |
| 38 | Color Primaries |
| 39 | Frame Count |
| 40 | Encoder |
| 41 | Encoder Settings |
| 42 | Transfer Characteristics |
| 43 | Matric Coefficients |
| 44 | Tagged Date |

The microphone metadata parameters can include parameters from the following table.

| No | Parameter |
| --- | --- |
| 1 | Type of microphone |
| 2 | Audio format |
| 3 | Number of channels |
| 4 | Audio sample rate |
| 5 | Output Sample rate |
| 6 | Audio channel azimuth |
| 7 | Audio channel elevation |
| 8 | Codec Id |
| 9 | Bit Depth |
| 10 | Bit Rate |
| 11 | Language |
| 12 | Encoder |
| 13 | Encoder Settings |
| 14 | Compression Mode |
| 15 | Stream Size |
| 16 | Alternate Group |

The sensor metadata parameters can include parameters from the following table.

| No | Parameter |
| --- | --- |
| 1 | Mirroring |
| 2 | Frame Synchronization |
| 3 | Enable APC |
| 4 | Minimum Depth Cutoff |
| 5 | Maximum Depth Cutoff |
| 6 | Registration |
| 7 | Registration Type |
| 8 | Hole Filler |
| 9 | White Balance |
| 10 | Gain |
| 11 | Close Range Mode |
| 12 | GMC Mode |
| 13 | Auto Gain Region of Interest |
| 14 | Wavelength Correction |
| 15 | Cropping Mode |
| 16 | Cropping Area |
| 17 | Anti Flicker |
| 18 | Image Quality |

The system metadata parameters can include parameters from the following table.

| No | Category | Parameter | Additional Description |
| --- | --- | --- | --- |
| 1 | Video Arrangement | Number of Cameras | Number of cameras in the arrangement |
| 2 | | Type of Camera | E.g., Mono or Stereo |
| 3 | | Location | E.g., gps coordinates + reference coordinate system of the main camera arrangement (rig) |
| 4 | | GPS Positioning | Indoor or outdoor positioning (for gps) |
| 5 | | Timed Location Data | Timed metadata of changing location |
| 6 | | Relative position of each camera in the camera arrangement | |

-continued

| No | Category | Parameter | Additional Description |
|---|---|---|---|
| 7 | | Orientation | E.g., yaw, pitch, roll of each camera in the camera arrangement |
| 8 | | Field of view of each lens | |
| 9 | Audio Arrangement | Location of microphones | |
| 10 | | Number of microphones | |

As shown in FIG. 4D, the pipeline describes an assertion check mechanism for verifying whether the workflow uses a certain requested process. In certain embodiments, a way of verifying whether a specific process was in fact performed by the workflow manager 434.

To provide a proof to the workflow owner that a certain process was used in the workflow (e.g., collection of user feedback 475 such as viewport data), the workflow owner can request in-line verification of such application of the process. If the workflow manager 434 forwards a confirmation of usage of the process to the workflow owner, it is possible that by the time the workflow owner receives confirmation (or denial) of the process, it would be very late to use the cloud processing resources. To solve this problem, the workflow owner, in the workflow creation request, it can include signaling information such as the following: Inline-process-verification: viewportcollection.

To include such information in the workflow creation request, the NVP described for process assertion structure can be enhanced to include an additional field in the value predicate with field name "Inline-process-verification" and the values of this field includes the names of the processes to be verified in-line.

When the workflow manager 434 receives a workflow creation request with a process related assertion NVP whose value predicate includes a non-null value for the "Inline-process-verification" field, the workflow manager 434 can setup a new task in the workflow for verifying the application of the process. Instead of sending the digitally signed confirmation code to the workflow owner, the workflow manager 434 can take the responsibility of making the measurement function 470 send the digitally signed confirmation code to this new task 480. The new task 480 can also receive the public certificate of the measurement function 470. This new task 480 can perform the functionality of verifying whether the digitally signed confirmation code is valid or not using the public certificate of the measurement function 470.

There are many use cases that are possible in which the workflow owner is a service provider who sets up the workflow. This is signaled to the media sources and the media sources are encouraged to stream content to the cloud. When there are more than one media source (e.g., a camera arrangement with each camera at a different geographic location), it should be possible that the assertion checks for each individual source is supported.

To support assertions when there are multiple sources involved that are streaming content to the network, the workflow owner, instead of sending a list of NVPs, it will send a collection of list of NVPs (i.e. a list of list of NVPs). Each element in the outer list has the following representation: SourceName: Name of Source; Identity: Public identify of source; and AssertionsList: List of NVPs to be asserted based on media originating from this source.

As described above, each member of outer list represents the source and the list of NVPs that need to be asserted based on media originating from that source. Both of parameter assertions and process assertions can be checked individually for each source using the assertion list structure.

To support this feature, the NVP structure can be enhanced with an additional field called "Percentage-sources-for-evaluation". This field, if present in the workflow request, can indicate to the workflow manager 434 the minimum percentage of sources whose assertions have to be absolutely checked.

In addition, the assertion structure for multiple sources scenario can include an additional field called "Source-Priority". This field can indicate to the workflow manager the relative priority of the source in the list of all sources.

In presence of both the fields-"Percentage-sources-for-evaluation" and "Source-Priority", the workflow manager 434 can process the assertions of all sources based on decreasing Source-Priority values up until at least the percentage of sources indicated by the "Percentage-sources-for-evaluation" are processed.

It is possible that the workflow owner intends to assert a set of parameters, but does not know the aggregation function to be used. So, in this case, the workflow owner only includes the list of parameters, but not the aggregation function. In this case, to support translation of workflow level assertion parameters to individual task level assertion parameters, the function definition that is included for each function in the function repository can be enhanced to include "support aggregation methods" for various parameters used. The function definition can include, for each parameter, the supported aggregation methods. As the workflow owner has access to function repository, the workflow manager can read this information and include the interested aggregation method in the NVP list. Optionally, if the workflow owner does not provide the aggregation function, the workflow manager can read such information from the function repository and use an appropriate aggregate function method.

To support assertion checks on usage of function grouping in the workflow, the candidate list of processes that can be verified, the list can be enhanced to include the following process.

| Process to be verified | Description |
|---|---|
| Process.functionGroup | Verify whether requested function grouping was used |

When this process assertion is included in the assertion list, the workflow manager takes the responsibility of verifying whether function grouping was in fact used in the workflow.

One way of verifying is that one of the functions in the function group provides digitally signed confirmation code to the workflow manager which the workflow manager can forward to workflow owner. Since the owner has access to function repository, it can get the certificate of the function and verify the signed code. Optionally, the workflow manager can insert a verification task in the workflow for "inline" verification as described in the one of the embodiments above.

To support digitally signing the confirmation code for usage of function groups, one of the functions in the function group can provide information in its definition regarding supporting process related assertions. Optionally, all the functions in the function group can share the same key to digitally sign the confirmation code. In this case, any function in the function grouping can provide confirmation of usage of function grouping in the workflow.

It is not possible at all times that the media processing in the cloud satisfies the list of all assertions presented by the workflow owner. In this case, there can be a provision to include the priority of assertions. To support this requirement, the NVP assertion structure can be enhanced to include a "Priority" field whose value is provided by the workflow owner. The value of Priority field indicates the relative priority of the assertion in the list of all assertions.

When the workflow manager receives a list of assertions that include the Priority field, it shall process the assertions in the order of the priority i.e. higher priority assertions are checked first before checking the lower priority assertions.

In addition to the Priority field, the workflow owner can also include additional field called "Min Priority", the value of which specifies the minimum priority value that the workflow manager must check. When the workflow manager 434 receives the workflow with a list of assertions and a Min Priority value, the workflow manager 434 can process the assertions whose priority is more than the Min Priority value.

For an added flexibility, the workflow owner can also specify the action for all assertions whose priority is lower than the Min Priority value in a field called "Min-Priority-Action". The set of values for this parameter can take is one among the set of Action parameter values.

Although FIG. 4A illustrate the environment-architecture and FIGS. 4B-4D illustrate example pipelines. Various changes can be made to FIGS. 4A-4D. For example, any number of functions can be included in the pipeline 436.

Figure 5:
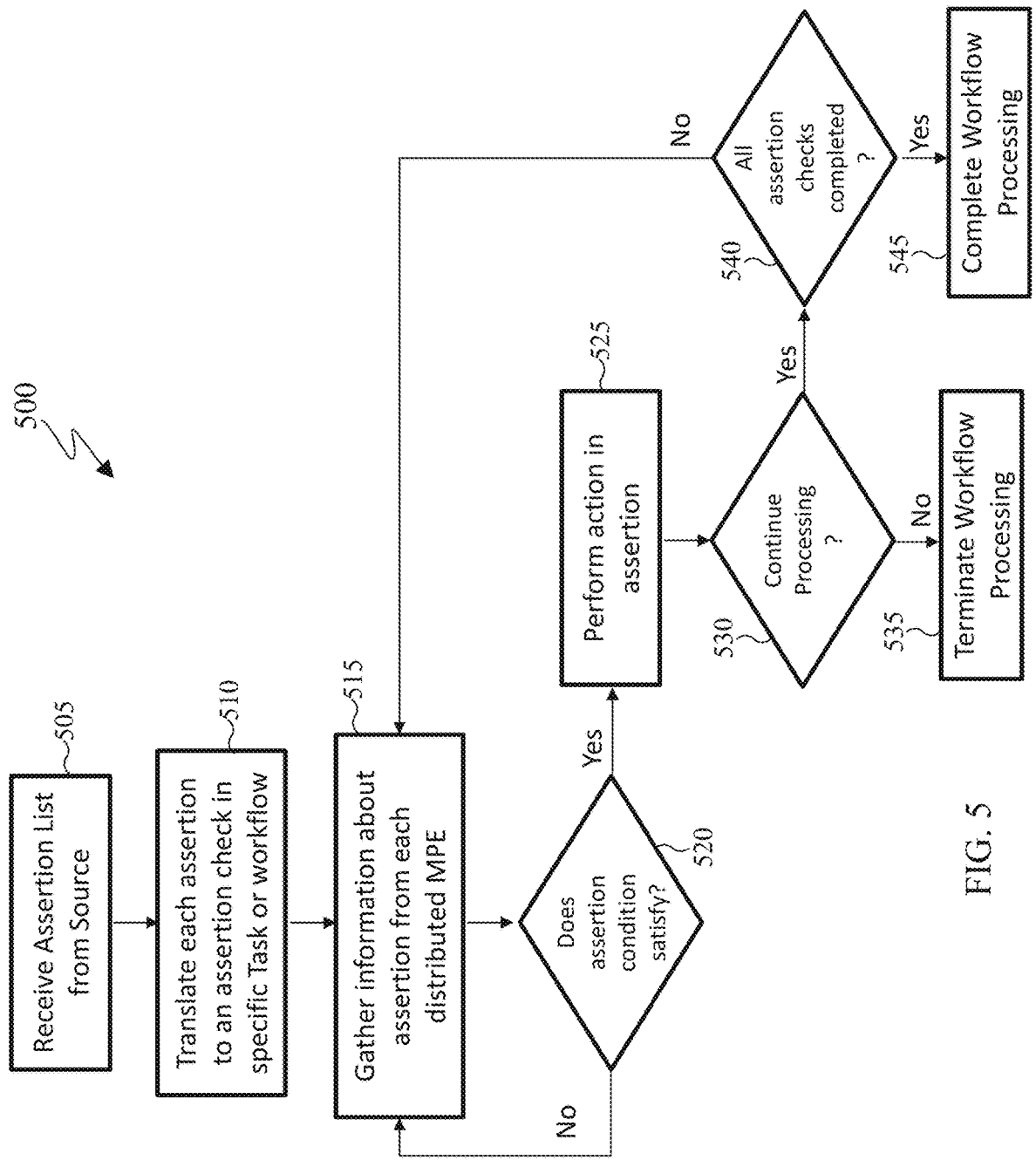
FIG. 5 illustrates an example method for assertion processing in accordance with an embodiment of this disclosure.

FIG. 5 illustrates an example method 500 for assertion processing in accordance with an embodiment of this disclosure. For example, the process depicted in FIG. 5 is described as implemented by the server 200 of FIG. 2, the electronic device 300 of FIG. 3, the electronic device 420 and the server 430 of FIG. 4A.

In operation 505, the server 430 can receive an assertion list from a source. The assertion list can include a plurality of assertions to be used for regulating a workflow pipeline. "Receiving" can include receiving from an external device, receiving from a user input, receiving from internal storage, etc.

In operation 510, the server 430 can translate each assertion to an assertion check in a specific task or workflow. The parameters and predicate values can be identified in the assertion and applied to the workflow.

In operation 515, the server 430 can gather information about an assertion from each distributed MPE. The MPE can provide information to the server 430 regarding the capabilities of the MPE including the various parameters related to the assertions.

In operation 520, the server 430 can determine whether an assertion condition is satisfied. The server 430 can compare the capabilities of the MPE received from each MPE to the parameters and predicate values included in each assertion. When the assertion condition is not satisfied, the method 500 can return to operation 515. When the assertion condition is satisfied, the method 500 can continue to operation 525.

In operation 525, the server 430 can perform an action in the assertion. Once the server 430 determines that the MPE can perform the operation within the requirements of the assertion, the action associated with the evaluation condition in the assertion is performed.

In operation 530, the server 430 can determine whether further processing is required. When no further processing is required, the method 500 continues at operation 535 and the server can terminate the workflow processing. When further processing is required, the method 500 continues at operation 540.

In operation 540, the server 430 can determine whether all assertion checks are completed. When all assertion checks are not completed, the method 500 returns to operation 515. When all assertion checks are completed, the method 500 continues with operation 545 and the server 430 can complete workflow processing.

Figure 6:
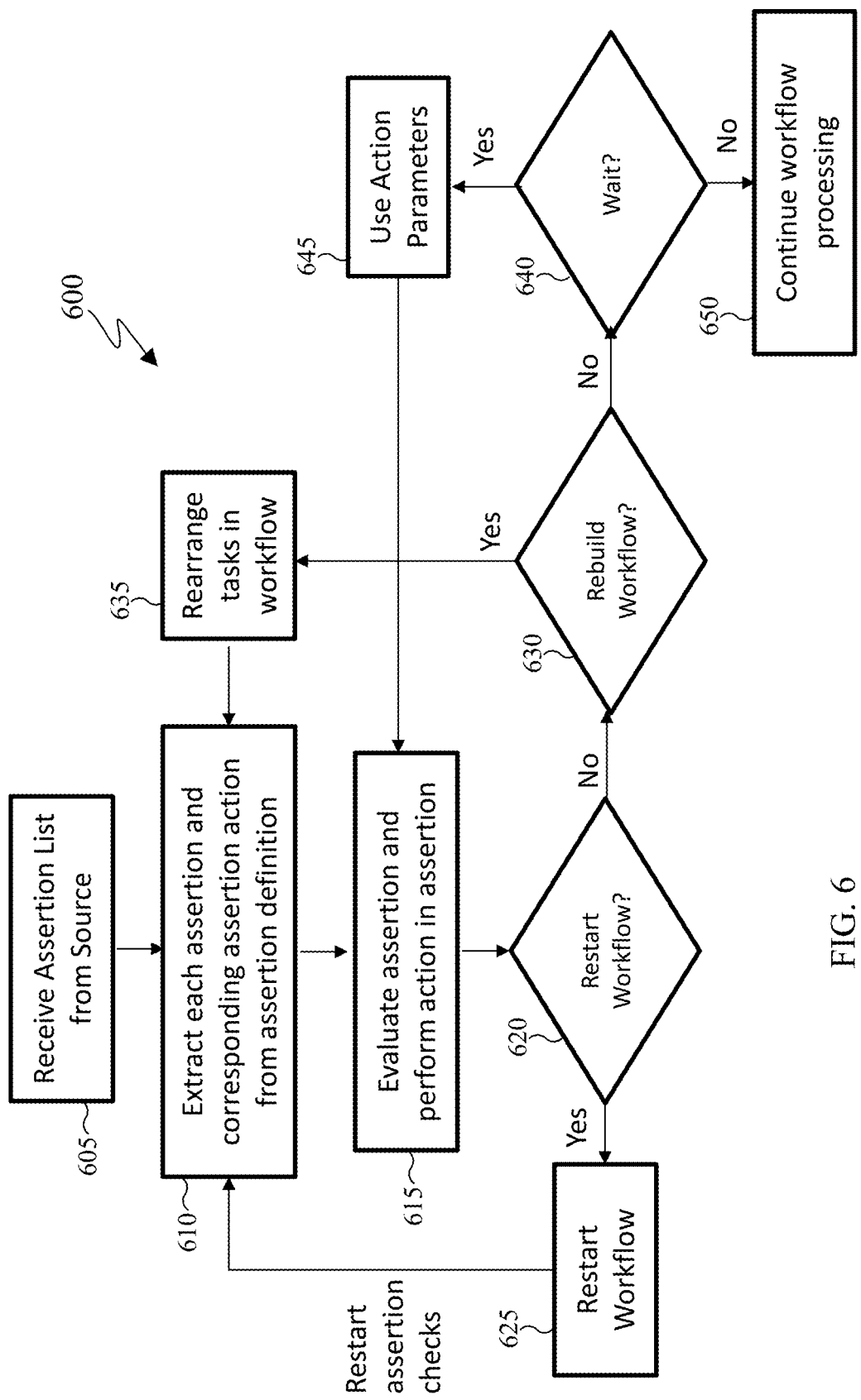
FIG. 6 illustrates an example method for processing assertion actions and action parameters in accordance with an embodiment of this disclosure.

FIG. 6 illustrates an example method 600 for processing assertion actions and action parameters in accordance with an embodiment of this disclosure. For example, the process depicted in FIG. 6 is described as implemented by the server 200 of FIG. 2, the electronic device 300 of FIG. 3, the electronic device 420 and the server 430 of FIG. 4A.

In operation 605, the server 430 can receive an assertion list from a source. The assertion list can include a plurality of assertions to be used for regulating a workflow pipeline.

In operation 610, the server 430 can extract each assertion and corresponding assertion action from an assertion definition. The parameters and predicate values can be identified in the assertion and applied to the workflow.

In operation 615, the server 430 can evaluate the assertion and perform an action in the assertion. Once the server 430 determines that the MPE can perform the operation within the requirements of the assertion, the action associated with the evaluation condition in the assertion is performed.

In operation 620, the server 430 can determine whether to restart the workflow. When the workflow need to be restarted, the method 600 can proceed to operation 625 and restart the workflow at operation 610. When the workflow does not need to be restarted, the method can continue to operation 630.

In operation 630, the server 430 can determine whether to rebuild the workflow. When no workflow rebuilding is required, the method 600 continues at operation 635. When further workflow rebuilding is not required, the method 600 continues at operation 640.

In operation 635, the server 430 can rearrange tasks in the workflow. The server 430 can determine that a different task is required to meet the assertions in the assertions list. The server 430 can find a different task within the same MPE or find a task with a different MPE. The method 600 continues with operation 610.

In operation 640, the server 430 can determine whether the action needs to be completed. When the action needs to be completed, the method 600 continues at operation 645. When further processing is required, the method 600 continues at operation 650 to continue workflow processing.

In operation 645, the server 430 can use remaining action parameters. The action parameters can be applied to the tasks in the workflow to verify that the actions included in the assertion are satisfied. The method 600 continues at operation 615.

Figure 7:
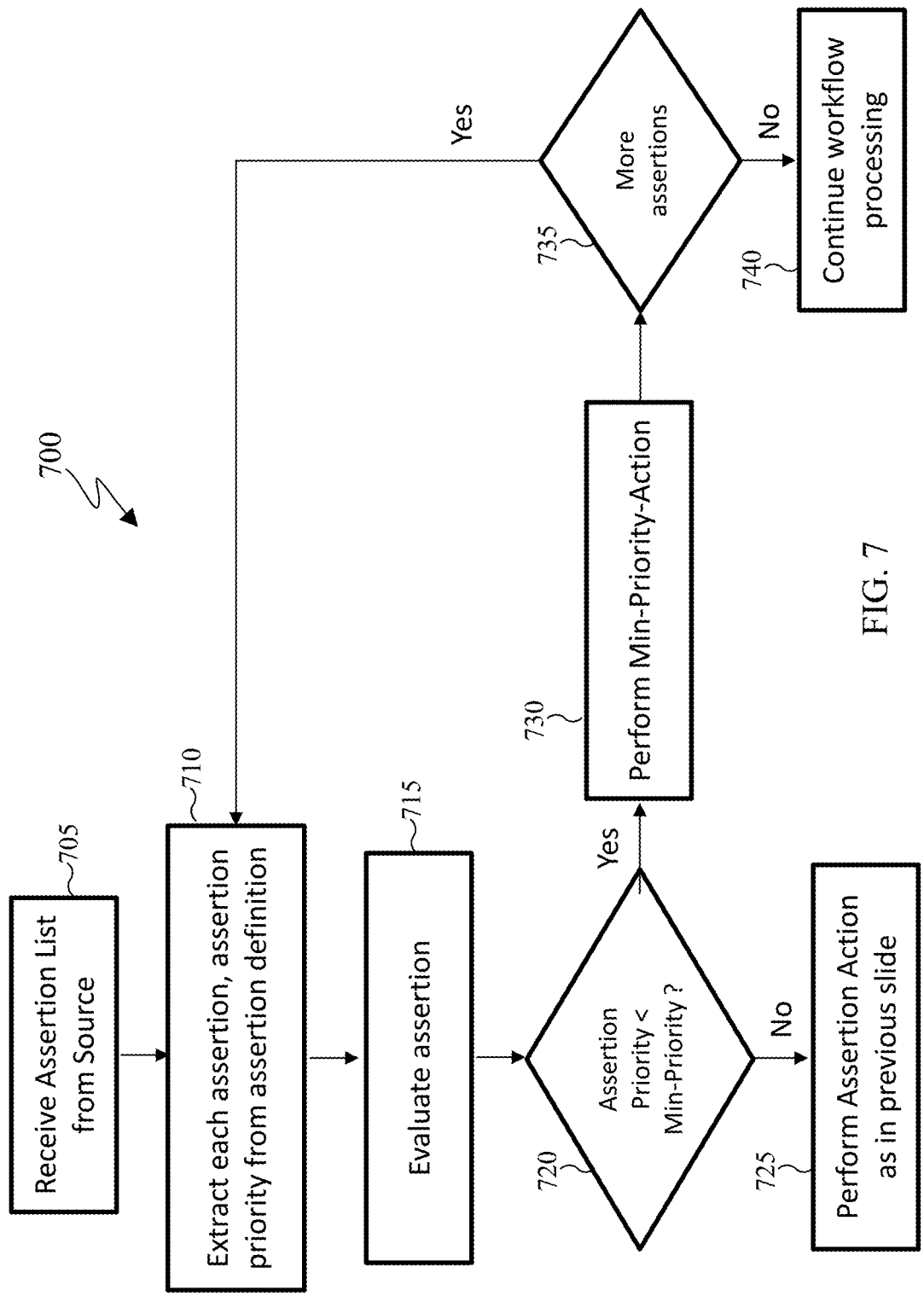
FIG. 7 illustrates an example method for processing assertion priorities and minimum priority actions in accordance with an embodiment of this disclosure.

FIG. 7 illustrates an example method 700 for processing assertion priorities and minimum priority actions in accordance with an embodiment of this disclosure. For example, the process depicted in FIG. 7 is described as implemented by the server 200 of FIG. 2, the electronic device 300 of FIG. 3, the electronic device 420 and the server 430 of FIG. 4A.

In operation 705, the server 430 can receive an assertion list from a source. The assertion list can include a plurality of assertions to be used for regulating a workflow pipeline.

In operation 710, the server 430 can extract each assertion and corresponding assertion priority from an assertion definition. The parameters and predicate values can be identified in the assertion and applied to the workflow.

In operation 715, the server 430 can evaluate the assertion. Once the server 430 determines that the MPE can perform the operation within the requirements of the assertion, the priority associated with the evaluation condition in the assertion is applied to the tasks in the workflow.

In operation 720, the server 430 can compare an assertion priority with a minimum priority. The minimum priority can be determined based on a minimum priority function defined by global descriptions. The server 430 can compare the assertion priority of each of the assertions to the minimum priority. A priority value can be based on the priority with the lower numbers indicating a higher priority. When the priority value of the assertion is less than a value associated with the minimum priority, the method 700 can continue to operation 730 and the server 430 can perform the action in the assertion. When the priority value of the assertion is less than the value associated with the minimum priority, the method 700 can continue to operation 725 and perform an assertion action associated with the assertion.

In operation 735, the server 430 can determine whether all assertions are completed. When all assertions are not completed, the method 700 returns to operation 710. When all assertions are completed, the method continues with operation 740 and the server 430 can continue workflow processing.

Figure 8:
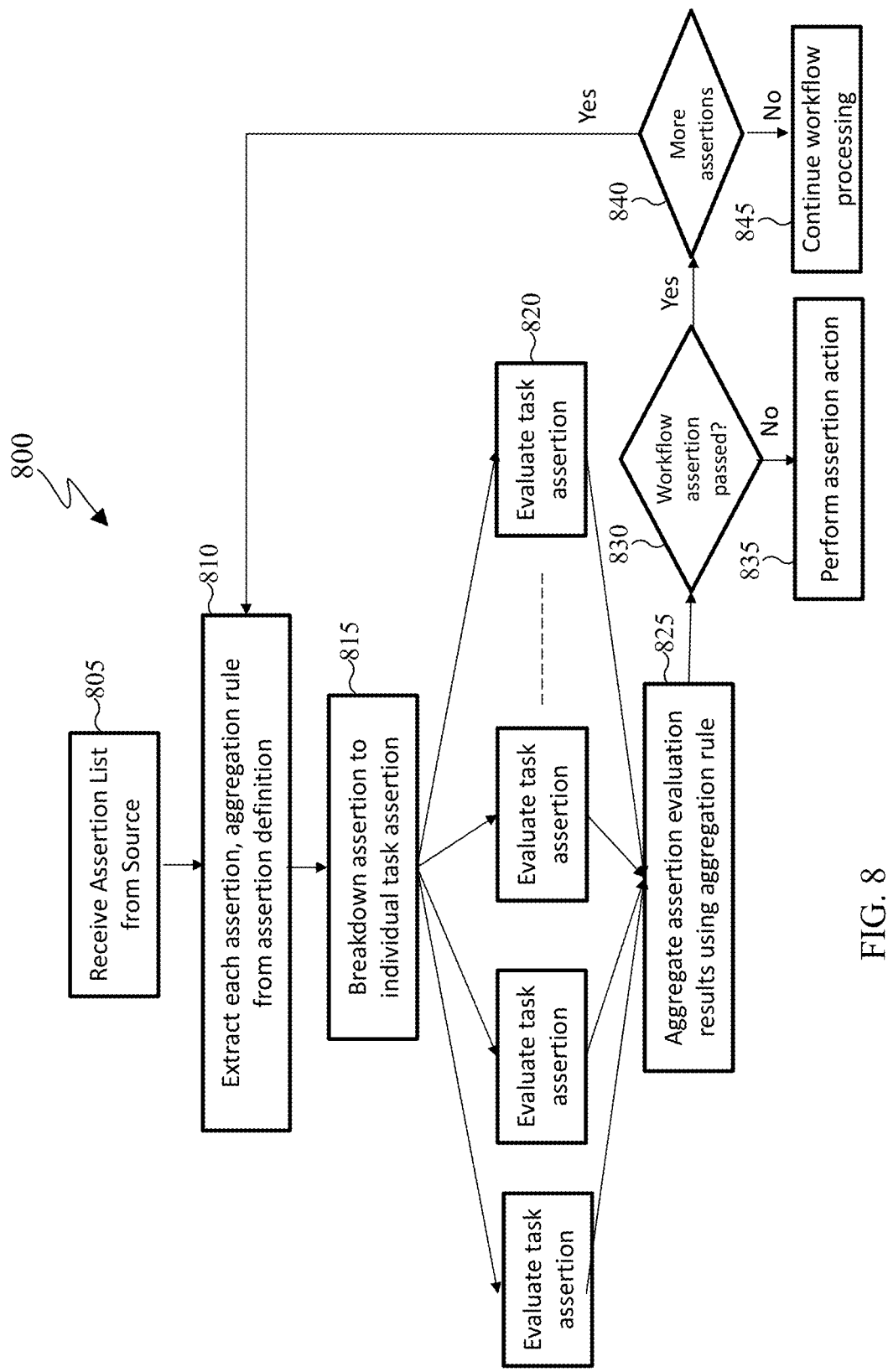
FIG. 8 illustrates an example method for processing assertion aggregation in accordance with an embodiment of this disclosure.

FIG. 8 illustrates an example method 800 for processing assertion aggregation in accordance with an embodiment of this disclosure. For example, the process depicted in FIG. 8 is described as implemented by the server 200 of FIG. 2, the electronic device 300 of FIG. 3, the electronic device 420 and the server 430 of FIG. 4A.

In operation 805, the server 430 can receive an assertion list from a source. The assertion list can include a plurality of assertions to be used for regulating a workflow pipeline.

In operation 810, the server 430 can extract each assertion and corresponding assertion priority from an assertion definition. The parameters and predicate values can be identified in the assertion and applied to the workflow.

In operation 815, the server 430 can breakdown the assertion into individual task assertions. The server 430 can determine that the assertion includes multiple action or task assertions that are aggregated.

In operation 820, the server 430 can determine evaluate each of the task assertions found in the assertion. The server 430 can evaluate each task assertion individually and simultaneously. The assertion can also include an evaluation order or priority of each task assertion.

In operation 825, the server 430 can aggregate the assertion evaluations results using an aggregation rule. Similar task assertions can be combined or removed based on the specific tasks assertion overlapping content.

In operation 830, the server 430 can determine whether the aggregated assertion evaluation results satisfies the workflow assertion. When the workflow assertion is not satisfied, the method 800 continues at operation 835 and the server 430 can perform an assertion action. When the workflow assertion is satisfied, the method 800 continues at operation 840.

In operation 840, the server 430 can determine whether all assertions are completed. When all assertions are not completed, the method 800 returns to operation 810. When all assertion checks are completed, the method continues with operation 845 and the server 430 can continue workflow processing.

Figure 9:
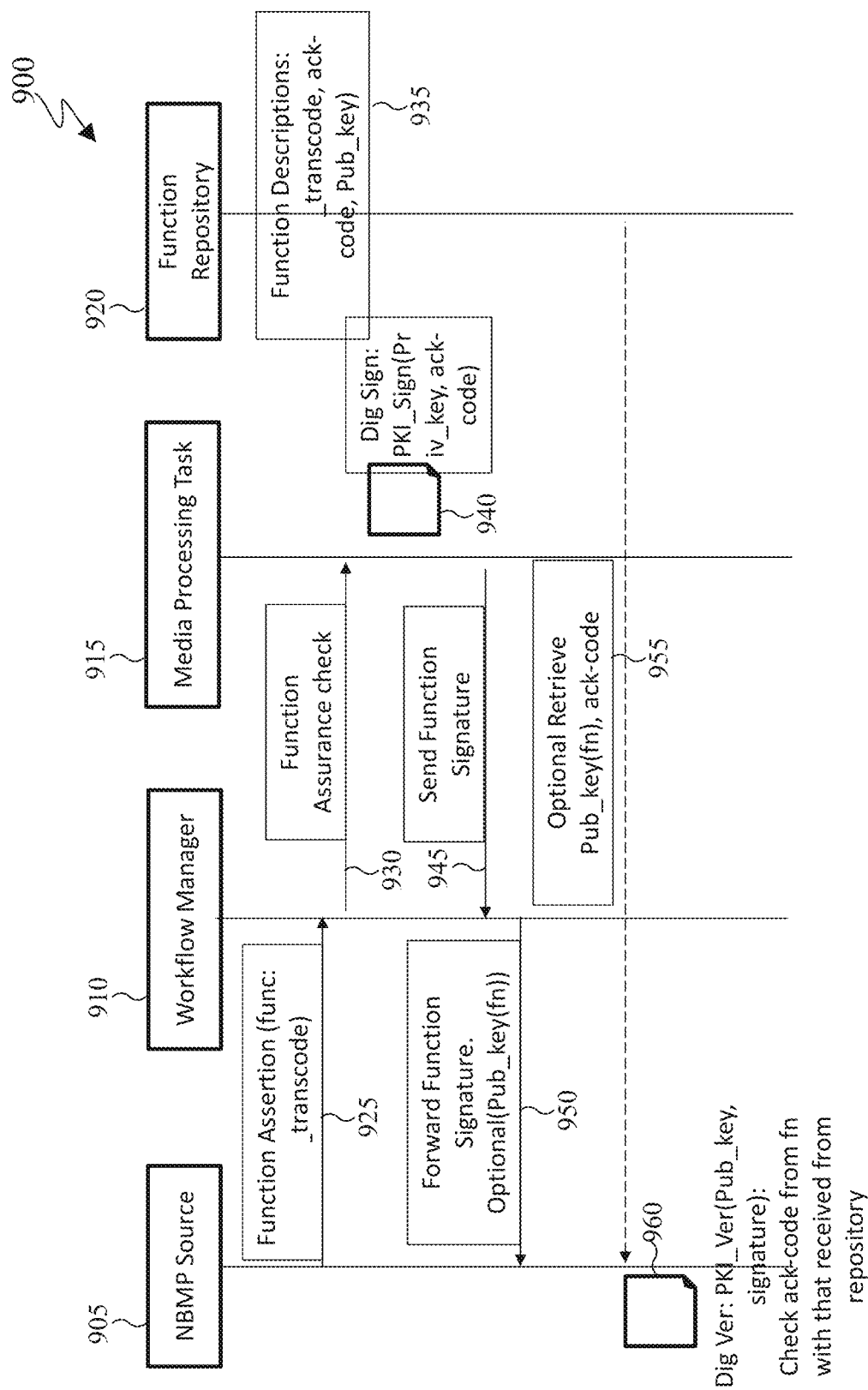
FIG. 9 illustrates an example method for media processing function assertions by a workflow manager in accordance with an embodiment of this disclosure.

FIG. 9 illustrates an example method 900 for media processing function assertions by a workflow manager in accordance with an embodiment of this disclosure. For example, the process depicted in FIG. 9 is described as implemented by the server 200 of FIG. 2, the electronic device 300 of FIG. 3, the electronic device 420 and the server 430 of FIG. 4A.

In operation 925, the source 905 can transmit a function assertion to the workflow manager 910. The function assertion can include a transcode. In operation 930, the workflow manager 910 can transmit a function assurance check to the media processing task 915.

In operation 935, the function repository 920 can check the function descriptions. The function descriptions can include the transcode, an acknowledgment code, and a public key. In operation 940, the media processing task 915 can generate a digital signature. The digital signature can include a PKI signature including a private key and an acknowledgement code.

In operation 945, the media processing task 915 can transmit a send function signature to the workflow manager. In operation 950, the workflow manager 910 can transmit a forward function signature to the source 905.

In operation 955, the media processing task 915 can provide an option retrieve of the public key and the acknowledgement code. In operation 960, the source 905 can generate a digital verification. The digital verification can include a PKI verification and a check acknowledgement code. The PKI verification can include the public key and a signature. The check acknowledgement code can be from a function that is received from the function repository 920.

Figure 10:
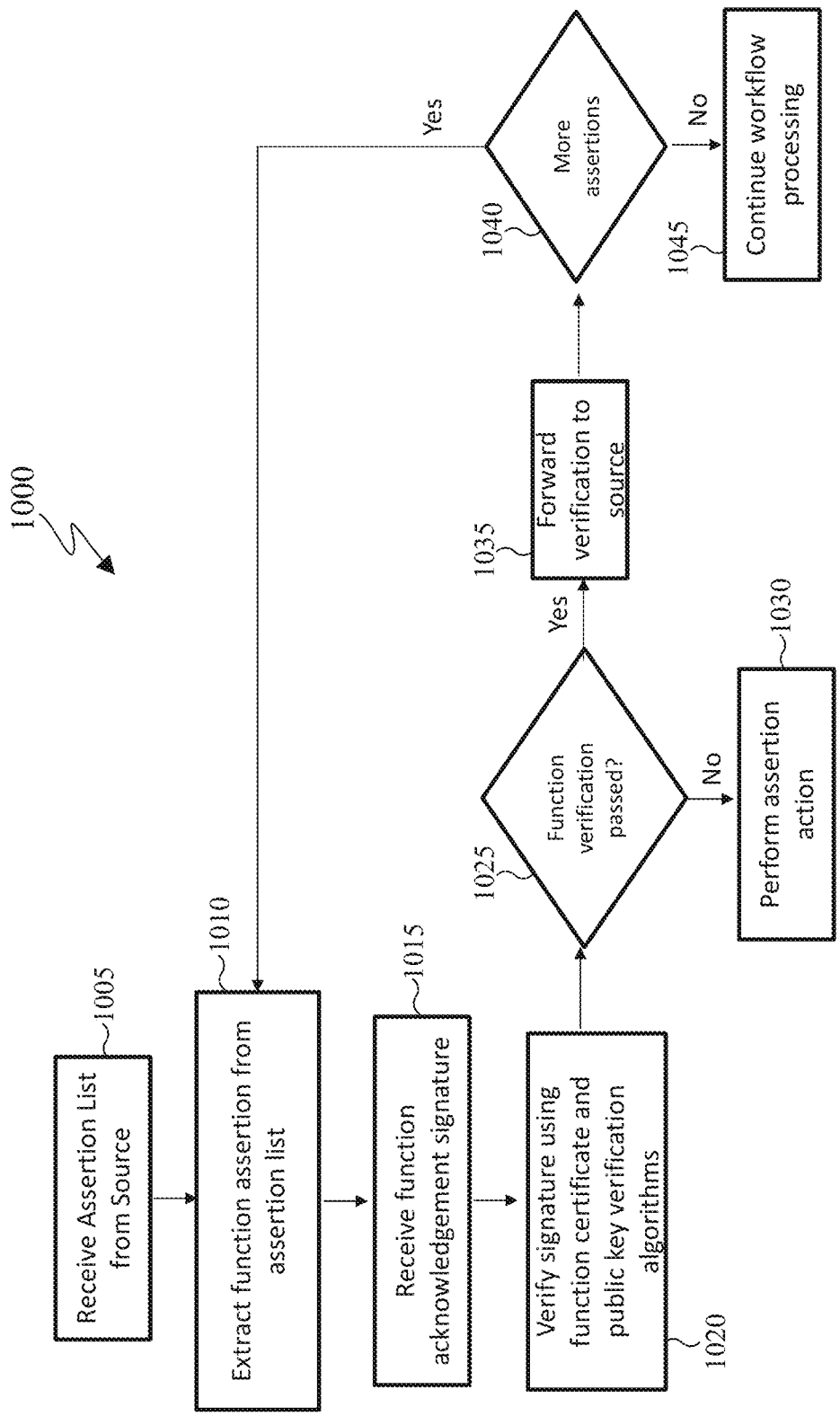
FIG. 10 illustrates an example method for media processing function assertions by a workflow manager in accordance with an embodiment of this disclosure.

FIG. 10 illustrates an example method 1000 for media processing function assertions by a workflow manager in accordance with an embodiment of this disclosure. For example, the process depicted in FIG. 10 is described as implemented by the server 200 of FIG. 2, the electronic device 300 of FIG. 3, the electronic device 420 and the server 430 of FIG. 4A.

In operation 1005, the server 430 can receive an assertion list from a source. The assertion list can include a plurality of assertions to be used for regulating a workflow pipeline.

In operation 1010, the server 430 can extract a function assertion from the assertion list. The parameters and predicate values for the function assertion can be identified in the assertion and applied to the workflow.

In operation 1015, the server 430 can receive a function acknowledgement signature. The MPE can provide the function signature to the server 430. The function signature can be a PKI signature that includes an acknowledgement code signed by a private key.

In operation 1020, the server 430 can verify the signature using the function certificate and the public key verification algorithms. The function certificate and the public key verification algorithm can be included in a function repository.

In operation 1025, the server 430 can determine whether the function verification is successful. When the function verification is not successful, the method continues at operation 1030 and the server 430 can perform an assertion action. When the function verification is successful, the method 1000 continues at operation 1035 and the server 430 can forward the verification to the source.

In operation 1040, the server 430 can determine whether all assertions are completed. When all assertions are not completed, the method 1000 returns to operation 1010. When all assertion checks are completed, the method 1000 continues with operation 1045 and the server 430 can continue workflow processing.

Figure 11:
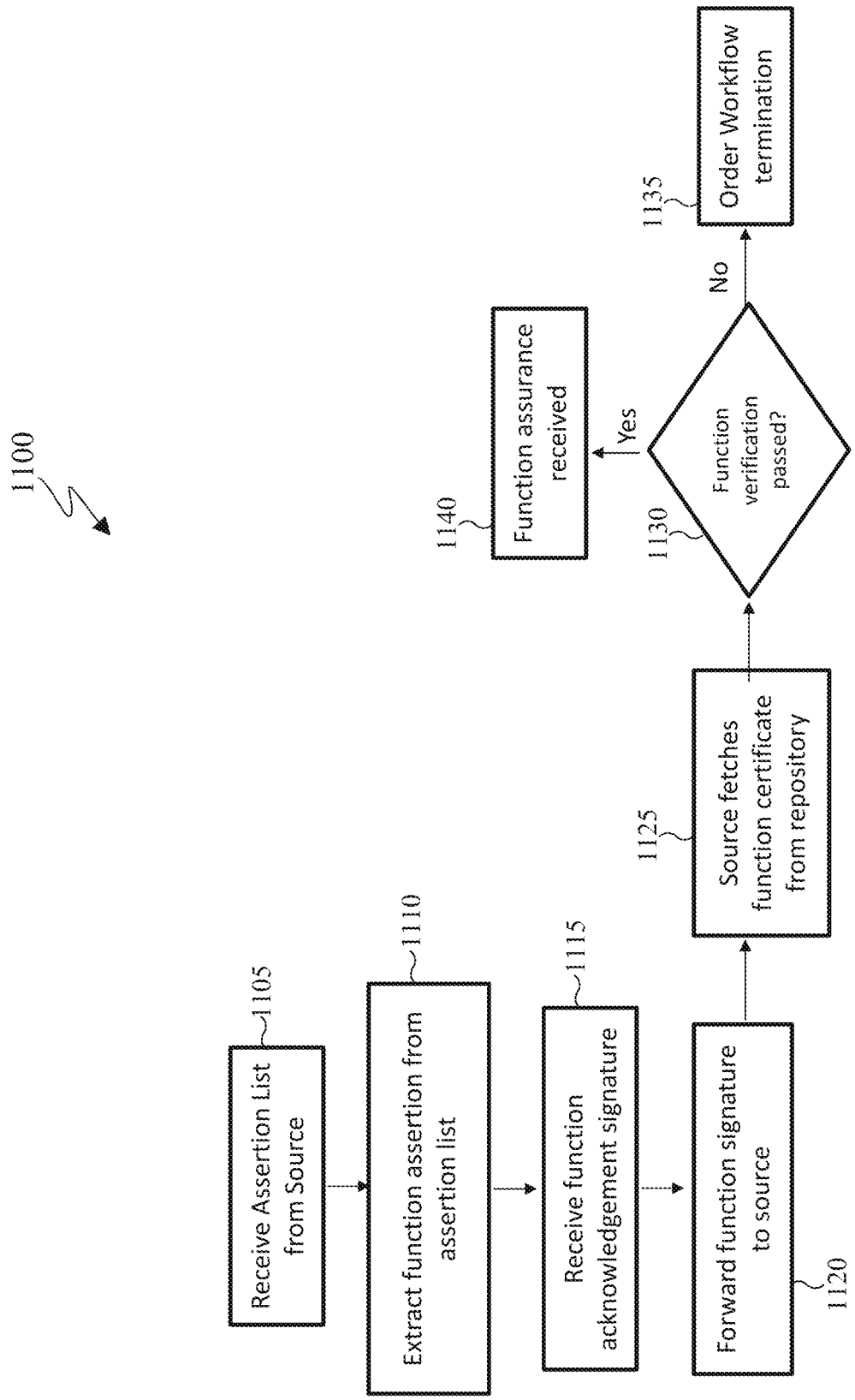
FIG. 11 illustrates an example method for media processing function assertions by a source entity in accordance with an embodiment of this disclosure.

FIG. 11 illustrates an example method 1100 for media processing function assertions by a source entity in accordance with an embodiment of this disclosure. For example, the process depicted in FIG. 11 is described as implemented by the server 200 of FIG. 2, the electronic device 300 of FIG. 3, the electronic device 420 and the server 430 of FIG. 4A.

In operation 1105, the server 430 can receive an assertion list from a source. The assertion list can include a plurality of assertions to be used for regulating a workflow pipeline.

In operation 1110, the server 430 can extract a function assertion from the function list. The parameters and predicate values can be identified in the assertion and applied to the workflow.

In operation 1115, the server 430 can receive a function acknowledgment signature. In operation 1120, the server 430 can forward the function signature to the source.

In operation 1125, the source can fetch a function certificate from the repository. In operation 1130, the server 430 can determine whether the function verification is successful. When the function verification is not successful, the method continues at operation 1135 and the server 430 can order a workflow termination. When the function verification is successful, the method 1100 continues at operation 1140 and the server 430 can forward a function assurance to the source.

Figure 12:
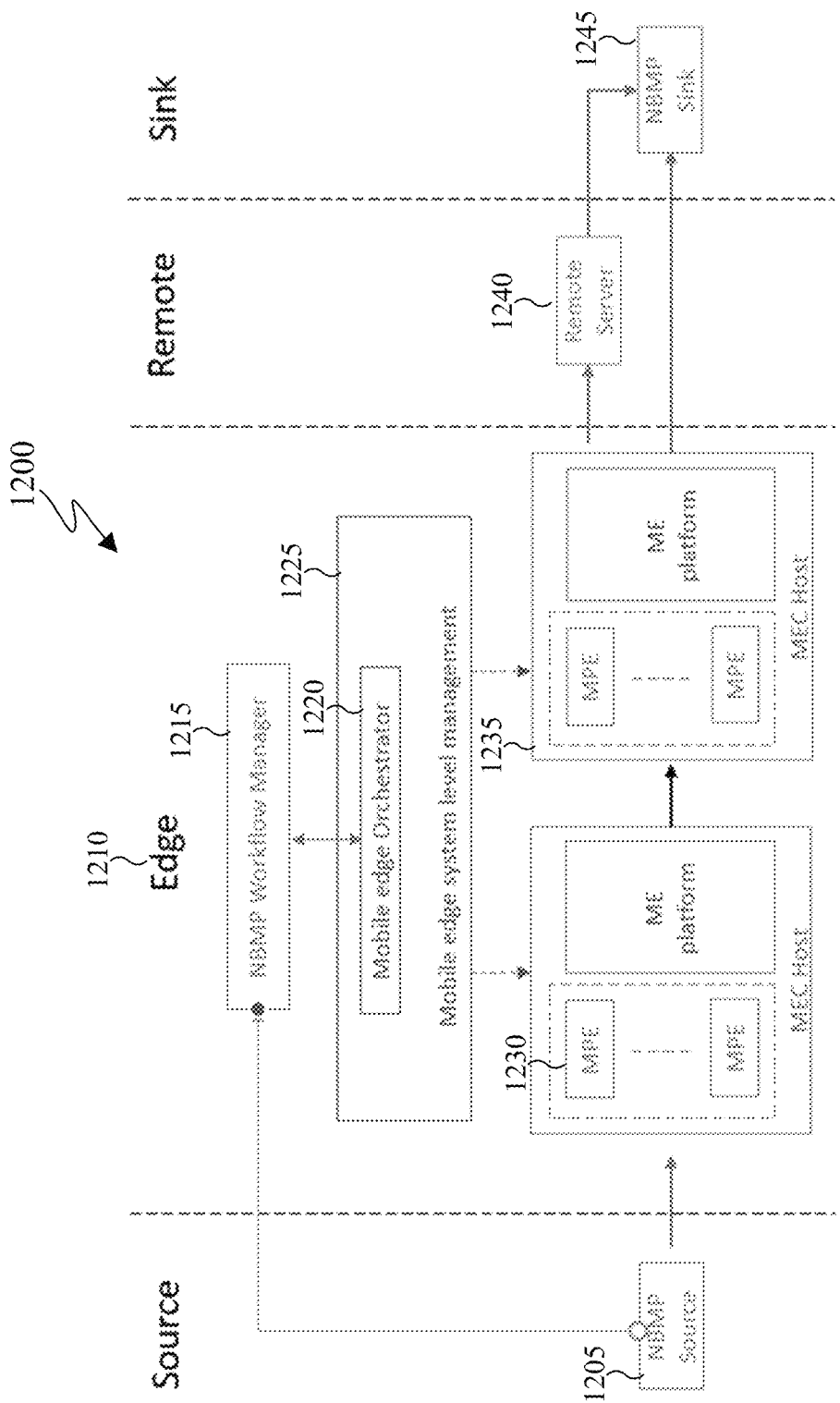
FIG. 12 illustrates a block diagram of an example environment-architecture in accordance with an embodiment of this disclosure.

FIG. 12 illustrates a block diagram 1200 of an example environment-architecture in accordance with an embodiment of this disclosure. The embodiment of FIG. 12 is for illustration only. Other embodiments can be used without departing from the scope of this disclosure.

In addition to the parameter and process assertions already described, it is also possible to have assertions based on deployment scenarios. With a number of deployment options available, it may be useful to provide assertion capabilities to the workflow owner so the owner can verify that the deployment of the workflow has happened on the requested deployment.

For example, a number of standard development organizations are working on deployment architectures for 5G, ETSI MEC, etc. For example, NBMP services can be enabled on top of MEC as shown in FIG. 12. The workflow owner or the source 1205 can request setup of media processing in the edge 1210. The NBMP workflow manager 1215 can interface with the Mobile Edge Orchestrator 1220 of the MEC architecture 1225 for on-demand and dynamic deployment of media processing entities 1230 in the edge network 1210. The media processing entities (MPE) 1230 are instantiated in the MEC hosts 1235. The MPEs 1230 are configured using the Task API described in NBMP standard by the workflow manager 1215 using the configuration APIs provided by the MEC system. The NBMP workflow manager 1215 is responsible to setup the data plane paths between different MPEs 1230 in the edge network 1210 and the remote server 1240/ NBMP sink 1245. The processing result of the MPEs 1230 in the edge network 1210 can be optionally sent to the remote server 1240 for additional processing if required. Otherwise, the result of media processing in the edge network 1210 can be directly sent to the NBMP sink 1245 for consumption.

It is possible that the workflow owner requests set up of the workflow on a specific deployment architecture. In this case, the workflow owner can assert the deployment assertion by sending the NVP list as described in the main embodiment. The Name parameter in the NVP structure shall start with "deployment". Possible values of this Name field are included the following table.

| Name field | Description |
| --- | --- |
| Deployment.ETSI_MEC | Verify whether the deployment happened in an MEC environment |
| Deployment.5G | Verify whether the deployment happened in an 5G network |

Figure 13:
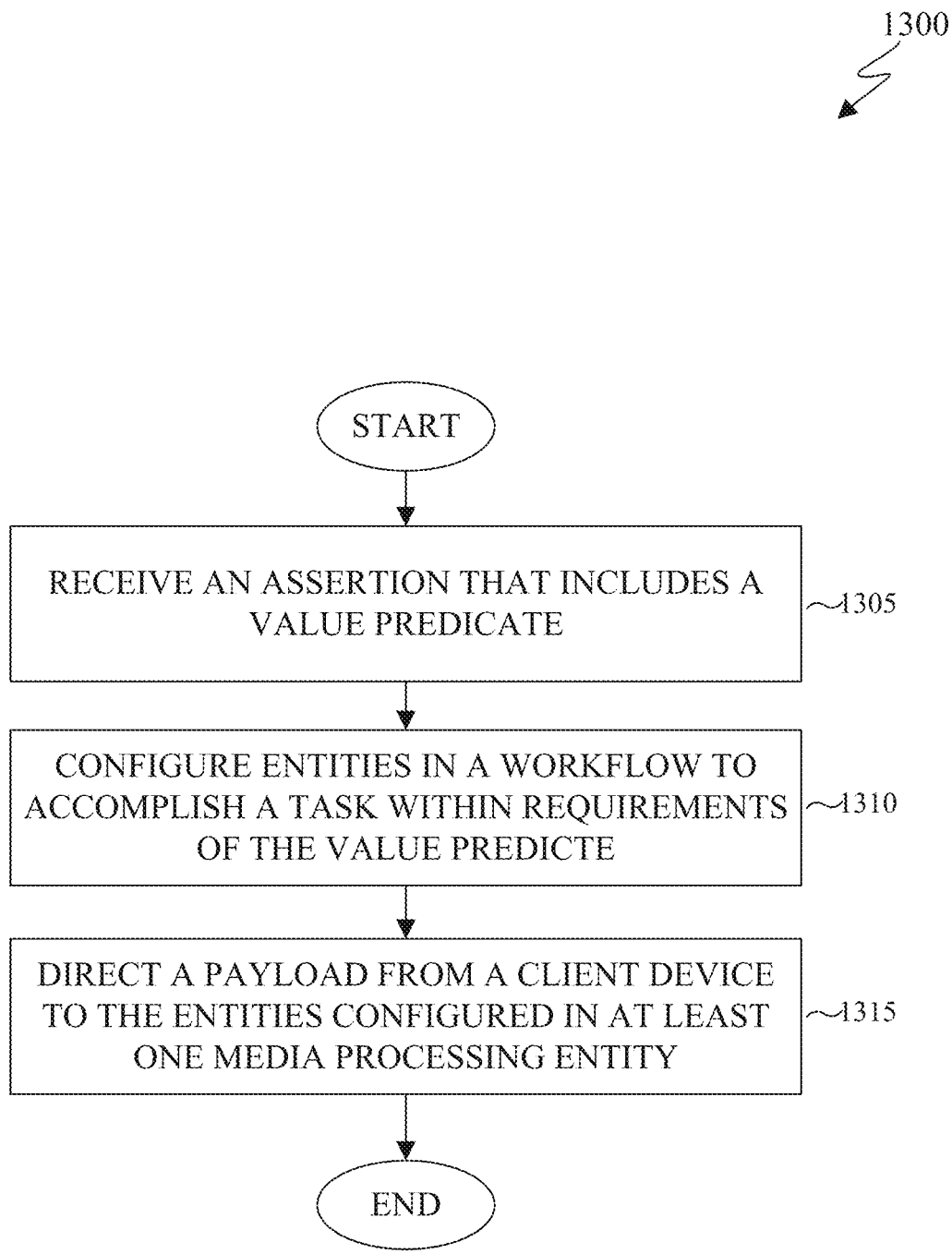
FIG. 13 illustrates an example method for enhanced assertion management in cloud media processing in accordance with an embodiment of this disclosure.

FIG. 13 illustrates an example method 1300 for enhanced assertion management in cloud media processing in accordance with an embodiment of this disclosure. For example, the process depicted in FIG. 13 is described as implemented by the server 200 of FIG. 2, the electronic device 300 of FIG. 3, the electronic device 420 and the server 430 of FIG. 4A.

In operation 1305, the server 430 can receive, from a client device, an assertion that includes a value predicate. The server 430 can also receive a workflow description including global definitions of assertions. "Receiving" can include receiving from an external device, receiving from a user input, receiving from internal storage, etc.

The value predicate can include an evaluation condition function, an aggregation function, an offset function, a priority function, an action function, and an action parameters function. The evaluation condition function can indicate a condition against which a parameter is checked with a given value. The aggregation function can be used to evaluate an assertion across all tasks in a workflow. The offset function can indicates an offset limit that a parameter can deviate from a given value for an evaluation condition. The priority function can indicate a priority of the assertion. The action function can indicate a function to perform when the evaluation fails. The action parameter function can indicate parameters while an action from the action function is performed.

The global definitions can include a minimum priority of assertions can include a minimum priority function, a minimum priority action function, a support verification function, a verification acknowledgement function, a public certificate function, and a global assertion function. The minimum priority function can indicate a minimum priority of assertions to apply in configuring the entities of the workflow. The minimum priority action function can indicate a common action to apply to assertions with priority lower than a minimum priority. The support verification function can indicate whether resources support providing verification information for validating assertions. The verification acknowledgement function can indicate acknowledgement of the support verification. The public certificate function can indicate a public certificate for signature verifications. The global assertion function including a dictionary of name value predicate pairs (NVPs), where each NVP includes a name field and a value predicate field.

In operation 1310, the server 430 can configure entities in a workflow to accomplish a task within requirements of the value predicate found in the assertion. The entities can be selected based on the assertions found in the assertion list and the global definitions found in the workflow description.

In operation 1315, the server 430 can direct a payload from a client device to the entities configured in at least one media processing entity. The configured entities can process the payload within the requirements determined by the assertion list and the global definitions.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
    a memory; and
    a processor coupled to the memory, the processor configured to:
        receive, from a client device, a workflow level assertion that includes a value predicate, wherein the value predicate includes an assertion check function used to evaluate the workflow level assertion across all tasks in a workflow;
        translate the workflow level assertion to individual task level assertions for the task in the workflow, using the assertion check function;
        configure entities in the workflow to accomplish the tasks within requirements of the individual task level assertions, respectively, so as to accomplish the workflow within requirements of the workflow level assertion; and
        direct a payload from the client device to the entities configured in at least one media processing entity.

2. The electronic device of claim 1, wherein the value predicate includes an evaluation condition function that indicates a condition against which a parameter is checked with a given value.

3. The electronic device of claim 1, wherein the value predicate includes an offset function that includes an offset limit that a parameter can deviate from a given value for an evaluation condition.

4. The electronic device of claim 1, wherein the value predicate includes a priority function that indicates a priority of the workflow level assertion.

5. The electronic device of claim 1, wherein the value predicate includes an action function to indicate an action to perform if an evaluation fails.

6. The electronic device of claim 5, wherein the value predicate includes an action parameter function that indicates parameters while the action from the action function is performed.

7. The electronic device of claim 5, wherein the processor is further configured to:
    receive a workflow description including global definitions of assertions.

8. The electronic device of claim 7, wherein the global definitions include:
    a minimum priority function indicating a minimum priority of assertions to apply in configuring the entities of the workflow,
    a minimum priority action function indicating a common action to apply to assertions with a priority lower than the minimum priority,
    a support verification function indicating whether resources support providing verification information for validating assertions,
    a verification acknowledgement function indicating acknowledgement of the support verification function,
    a public certificate function indicating a public certificate for signature verifications, and
    a global assertion function including a dictionary of name value predicate pairs (NVPs), where each NVP includes a name field and a value predicate field.

9. A method comprising:
    receiving, from a client device, a workflow level assertion that includes a value predicate, wherein the value predicate includes an assertion check function used to evaluate the workflow level assertion across all tasks in a workflow;
    translating the workflow level assertion to individual task level assertions for the task in the workflow, using the assertion check function;
    configuring entities in the workflow to accomplish each of the tasks within requirements of the individual task level assertions, respectively, so as to accomplish the workflow within requirements of the workflow level assertion; and
    directing a payload from the client device to the entities configured in at least one media processing entity.

10. The method of claim 9, wherein the value predicate includes an evaluation condition function that indicates a condition against which a parameter is checked with a given value.

11. The method of claim 9, wherein the value predicate includes an offset function that includes an offset limit that a parameter can deviate from a given value for an evaluation condition.

12. The method of claim 9, wherein the value predicate includes a priority function that indicates a priority of the workflow level assertion.

13. The method of claim 12, wherein the value predicate includes an action function to indicate an action to perform if an evaluation fails.

14. The method of claim 13, wherein the value predicate includes an action parameter function that indicates parameters while the action from the action function is performed.

15. The method of claim 13, further comprising:
    receiving a workflow description including global definitions of assertions.

16. The method of claim 15, wherein the global definitions include:
    a minimum priority function indicating a minimum priority of assertions to apply in configuring the entities of the workflow, a minimum priority action function indicating a common action to apply to assertions with a priority lower than the minimum priority, a support verification function indicating whether resources support providing verification information for validating assertions, a verification acknowledgement function indicating acknowledgement of the support verification function, a public certificate function indicating a public certificate for signature verifications, and a global assertion function including a dictionary of name value predicate pairs (NVPs), where each NVP includes a name field and a value predicate field.

17. A non-transitory computer readable medium embodying a computer program, the computer program comprising computer readable program code that, when executed by a processor of an electronic device, causes the processor to:

receive, from a client device, a workflow level assertion that includes a value predicate, wherein the value predicate includes an assertion check function used to evaluate the workflow level assertion across all tasks in a workflow;

translate the workflow level assertion to individual task level assertions for the task in the workflow, using the assertion check function;

configure entities in the workflow to accomplish each of the tasks within requirements of the individual task level assertions, respectively, so as to accomplish the workflow within requirements of the workflow level assertion; and direct a payload from the client device to the entities configured in at least one media processing entity.

18. The non-transitory computer readable medium of claim 17, receiving a workflow description including global definitions of assertions, wherein the global definitions include:

a minimum priority function indicating a minimum priority of assertions to apply in configuring the entities of the workflow, a minimum priority action function indicating a common action to apply to assertions with a priority lower than the minimum priority, a support verification function indicating whether resources support providing verification information for validating assertions, a verification acknowledgement function indicating acknowledgement of the support verification function, a public certificate function indicating a public certificate for signature verifications, and a global assertion function including a dictionary of name value predicate pairs (NVPs), where each NVP includes a name field and a value predicate field.

19. The non-transitory computer readable medium of claim 17, wherein the value predicate includes an evaluation condition function that indicates a condition against which a parameter is checked with a given value.

20. The non-transitory computer readable medium of claim 17, wherein the value predicate includes an offset function that includes an offset limit that a parameter can deviate from a given value for an evaluation condition.

\* \* \* \* \*